US010635580B2

(12) United States Patent
Bordia et al.

(10) Patent No.: US 10,635,580 B2
(45) Date of Patent: Apr. 28, 2020

(54) BUFFERING STORAGE DEVICE DATA IN A HOST MEMORY BUFFER

(71) Applicant: Western Digital Technologies, Inc., San Jose, CA (US)

(72) Inventors: Kalpit Bordia, Bangalore (IN); Raghavendra Gopalakrishnan, Bangalore (IN); Sachin Krishna Kudva, Pune (IN); Ashim Ranjan Saikia, Bangalore (IN); Bhanushankar Doni Gurudath, Bangalore (IN); Ramanathan Muthiah, Bangalore (IN); Pradeep Sreedhar, Bangalore (IN); Prashanth Reddy Enukonda, Bangalore (IN); Ramkumar Ramamurthy, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 26 days.

(21) Appl. No.: 16/030,810

(22) Filed: Jul. 9, 2018

(65) Prior Publication Data

US 2020/0012595 A1    Jan. 9, 2020

(51) Int. Cl.
*G06F 12/02* (2006.01)
*G06F 13/28* (2006.01)

(52) U.S. Cl.
CPC .......... *G06F 12/0238* (2013.01); *G06F 13/28* (2013.01); *G06F 2212/202* (2013.01)

(58) Field of Classification Search
CPC . G06F 12/0238; G06F 13/28; G06F 2212/202
See application file for complete search history.

(56) References Cited

U.S. PATENT DOCUMENTS

| 8,583,854 | B2 | 11/2013 | Ji et al. |
| 8,918,580 | B2 | 12/2014 | Cheon |
| 9,104,327 | B2 | 8/2015 | Gorobets et al. |
| 9,471,254 | B2 | 10/2016 | Shaharabany et al. |
| 9,563,382 | B2 | 2/2017 | Hahn et al. |
| 9,990,158 | B2 | 6/2018 | Shaharabany et al. |
| 2016/0232112 | A1 | 8/2016 | Lee |
| 2016/0274797 | A1 | 9/2016 | Hahn |
| 2017/0060668 | A1* | 3/2017 | Farhan ................ G06F 11/0793 |
| 2017/0242606 | A1* | 8/2017 | Vlaiko .................. G06F 3/0625 |
| 2018/0039578 | A1* | 2/2018 | Yun ..................... G06F 12/1009 |

* cited by examiner

*Primary Examiner* — Tasnima Matin
(74) *Attorney, Agent, or Firm* — Vierra Magen Marcus LLP

(57) ABSTRACT

Apparatus, systems, methods, and computer program products for buffering storage device data in a host memory buffer (HMB) are presented. A non-volatile memory and a controller are in communication with a non-volatile memory. A controller is configured to receive an input/output (I/O) operation including data. A controller is configured to transmit at least a portion of data to an HMB of a host device separate from a non-volatile memory and a controller for storage until a trigger event occurs.

20 Claims, 15 Drawing Sheets

BUFFERING STORAGE DEVICE DATA IN A HOST MEMORY BUFFER

TECHNICAL FIELD

The present disclosure, in various embodiments, relates to storage operations and more particularly relates to buffering storage device data in a host memory buffer.

BACKGROUND

Many storage controllers include a buffer to at least temporarily store data while performing an input/output (I/O) operation (e.g., read operations, write operations, etc.). The performance of the storage controller can be largely dependent upon the size, availability, and/or speed of the buffer. For example, a storage controller will not perform as well as it otherwise could perform if the buffer is consistently full or nearly full. Similarly, the performance of a storage controller can be adversely affected if the storage system including the storage controller and the host device exchange data at different speeds and/or rates (e.g., the storage system is faster or slower than the host device) because it can affect when and/or how data is buffered by the storage system.

SUMMARY

Apparatuses that buffer storage device data in a host memory buffer (HMB) are presented. In one embodiment, an apparatus includes a non-volatile memory and a controller in communication with the non-volatile memory. A controller, in certain embodiments, is configured to receive an input/output (I/O) operation including data. In some embodiments, a controller is configured to transmit at least a portion of data to an HMB of a host device separate from a non-volatile memory and a controller for storage until a trigger event occurs.

Another apparatus, in certain embodiments, includes means for receiving data at a memory device from a host device for storing in non-volatile memory of the memory device. An apparatus, in one embodiment, includes means for sending at least a portion of received data from a memory device back to a memory buffer of a host device prior to storing the portion of the received data in a non-volatile memory of the memory device.

Methods for buffering storage device data in an HMB are presented. In one embodiment, a method includes a controller receiving an I/O command including data from a host device. A method, in certain embodiments, includes transmitting at least a portion of data to an HMB of a host device for at least temporary storage until a trigger event occurs. In various embodiments, a host device and an HMB are separate from a controller.

Also presented are systems for buffering storage device data in an HMB. A system, in one embodiment, includes a host device including an HMB and a non-volatile memory in communication with the host device. A non-volatile memory, in certain embodiments, includes a controller including an I/O circuit that receives an I/O request with data from a host device and a transfer circuit that stores at least a portion of the data to an HMB until a trigger event occurs.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which.

DETAILED DESCRIPTION

Figure 1A:
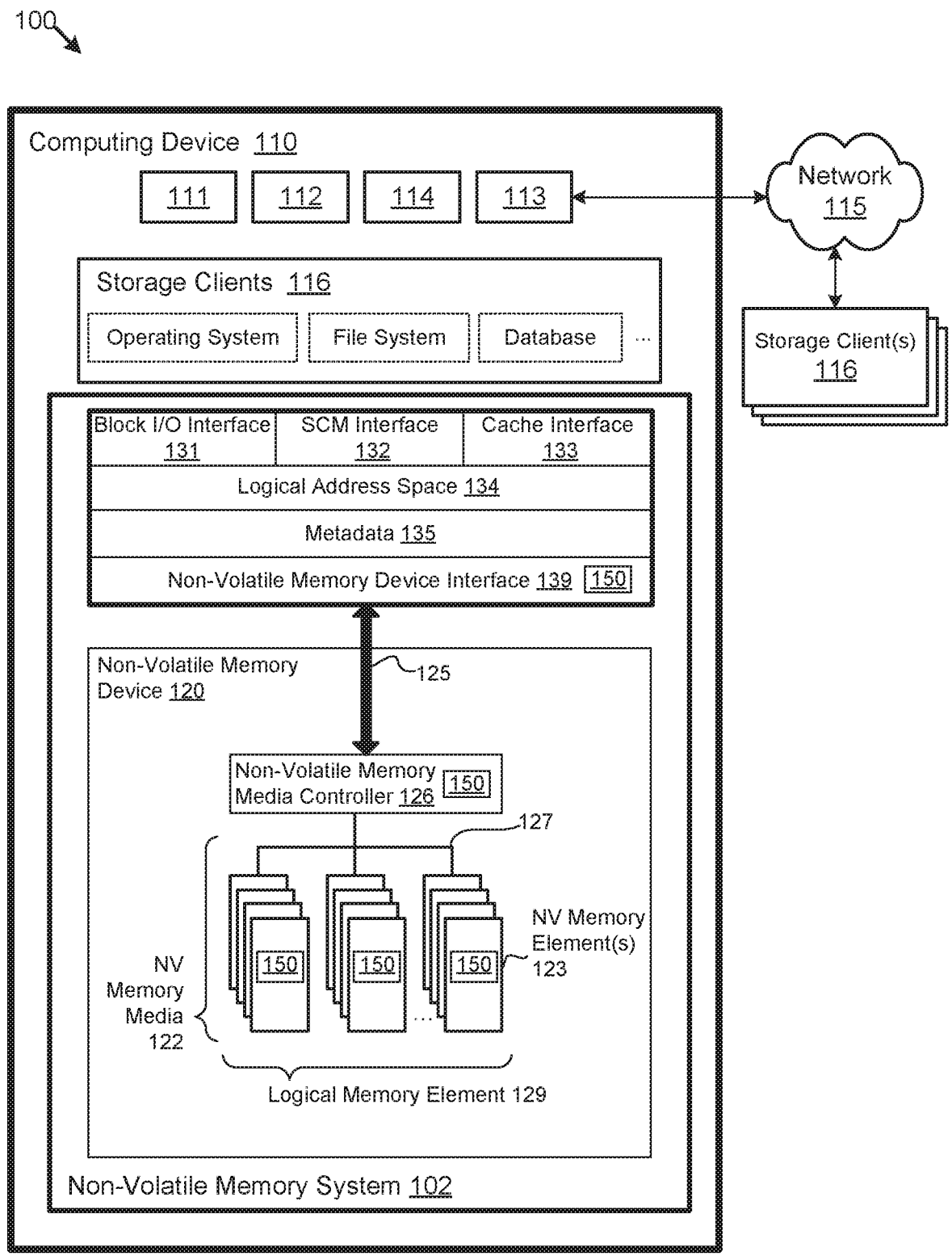
FIG. 1A is a schematic block diagram illustrating one embodiment of a system providing dynamic compaction for a garbage collection and/or folding process.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer-readable storage media storing computer-readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer-readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring metadata can include the entirety of the metadata, a portion of the metadata, a set of the metadata, and/or a subset of the metadata.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1A is a block diagram of one embodiment of a system 100 comprising a buffering component 150 for a controller 126 of a non-volatile memory device 120. The buffering component 150 may be part of and/or in communication with a controller 126, a non-volatile memory element 123, a device driver, or the like. The buffering component 150 may operate on a non-volatile memory system 102 of a computing device 110, which may include a processor 111, volatile memory 112, and a communication interface 113. The processor 111 may include one or more central processing units, one or more general-purpose processors, one or more application-specific processors, one or more virtual processors (e.g., the computing device 110 may be a virtual machine operating within a host), one or more processor cores, or the like. The communication interface 113 may include one or more network interfaces configured to communicatively couple the computing device 110 and/or controller 126 to a communication network 115, such as an Internet Protocol (IP) network, a Storage Area Network (SAN), wireless network, wired network, or the like.

The non-volatile memory device 120, in various embodiments, may be disposed in one or more different locations relative to the computing device 110. In one embodiment, the non-volatile memory device 120 comprises one or more non-volatile memory elements 123, such as semiconductor chips or packages or other integrated circuit devices disposed on one or more printed circuit boards, storage housings, and/or other mechanical and/or electrical support structures. For example, the non-volatile memory device 120 may comprise one or more direct inline memory module (DIMM) cards, one or more expansion cards and/or daughter cards, a solid-state-drive (SSD) or other hard drive device, and/or may have another memory and/or storage form factor. The non-volatile memory device 120 may be integrated with and/or mounted on a motherboard of the computing device 110, installed in a port and/or slot of the computing device 110, installed on a different computing device 110 and/or a dedicated storage appliance on the network 115, in communication with the computing device 110 over an external bus (e.g., an external hard drive), or the like.

The non-volatile memory device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the non-volatile memory device 120 may be disposed on a peripheral bus of the computing device 110, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device 120 may be disposed on a data network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The computing device 110 may further comprise a non-transitory, computer-readable storage medium 114. The computer-readable storage medium 114 may comprise executable instructions configured to cause the computing device 110 (e.g., processor 111) to perform steps of one or more of the methods disclosed herein. Alternatively, or in addition, the buffering component 150 may be embodied as one or more computer-readable instructions stored on the non-transitory storage medium 114.

Data movement may be followed by flash translation layer (FTL) entry additions for tracking the location of moved data. Hence, latency for a compaction process may be the sum of the latency of actual compaction and the latency for the FTL entry additions for the data that is moved. The time required to complete the compaction and FTL entry additions for a given block may be based on the number of valid data fragments in the block. If the quantity of valid data fragments (or valid data) is high (e.g., greater than 50%, or the like) for an SLC block, the data stored therein may also be folded.

The non-volatile memory system 102, in some embodiments, includes a buffering component 150. The buffering component 150, in one embodiment, is configured to facilitate buffering operations performed by a controller, as described below. The buffering component 150, in certain embodiments, may receive a notification that the controller is going to perform an I/O command/operation. The buffering component 150, in response to the notification, may identify and/or calculate an amount of valid data and/or valid data fragments in one or more transfer random access memory (TRAM) devices. The buffering component 150 may further buffer data and/or data fragments of a write operation in a host memory buffer (HMB) (e.g., a buffer of a host device) in response to determining that the TRAM is full and/or is storing greater than a predetermined amount/percentage of data. In additional or alternative embodiments, the buffering component 150 may buffer data to be read from non-volatile memory in the HMB in response to determining that the controller and the host device operate and/or exchange data at different rates/speeds, which difference can cause undue latency. In further embodiments, the HMB can buffer data that is being written to non-volatile memory until the data is successfully written without error to ensure that a copy of the data exists and/or that the data is mirrored in the unlikely event that the data becomes corrupted and/or otherwise unavailable. In still further additional or alternative embodiments, the buffering component 150 may manage data buffered in the HMB in accordance with a First In, First Out (FIFO) policy. Thus, the buffering component 150 can dynamically utilize an HMB in a host device to buffer data that is to be written to and/or read from a storage system separate from the host device. In other words, the buffering component 150 can utilize an HMB in the host device to supplement the buffer(s) in a controller (e.g., a storage controller).

In various embodiments, the buffering component 150 may comprise logic hardware of one or more non-volatile memory devices 120, such as a controller 126, a non-volatile memory element 123, a device controller, a field-programmable gate array (FPGA) or other programmable logic, firmware for an FPGA or other programmable logic, microcode for execution on a microcontroller, an application-specific integrated circuit (ASIC), or the like. In other embodiments, the buffering component 150 may comprise executable software code, such as a device driver or the like, stored on the computer-readable storage medium 114 for execution on the processor 111. In further embodiments, the buffering component 150 may include a combination of both executable software code and logic hardware.

In various embodiments, the buffering component 150 is configured to receive I/O requests from a device driver or other executable application via a bus 125 or the like. The buffering component 150 may be further configured to transfer data to/from a device driver and/or storage clients 116 via the bus 125. Accordingly, the buffering component 150, in various embodiments, may comprise and/or be in communication with one or more direct memory access (DMA) modules, remote DMA modules, bus controllers, bridges, buffers, and so on to facilitate the transfer of storage requests and associated data. In other embodiments, the buffering component 150 may receive storage requests as an API call from a storage client 116, as an IO-CTL command, or the like.

According to various embodiments, a controller 126 in communication with one or more buffering components 150 may manage one or more non-volatile memory devices 120 and/or non-volatile memory elements 123. The non-volatile memory device(s) 120 may comprise recording, memory, and/or storage devices, such as solid-state storage device(s) and/or semiconductor storage device(s) that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, blocks, sectors, collections or sets of physical storage locations (e.g., logical pages, logical blocks), or the like.

A device driver and/or the controller 126, in certain embodiments, may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device 120 may maintain metadata 135, such as a logical to physical address mapping structure, to map logical addresses of the logical address space 134 to media storage locations on the non-volatile memory device(s) 120. A device driver may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

A device driver may be communicatively coupled to one or more non-volatile memory devices 120. The one or more non-volatile memory devices 120 may include different types of non-volatile memory devices including, but not limited to: solid-state storage devices, semiconductor storage devices, SAN storage resources, or the like. The one or more non-volatile memory devices 120 may comprise one or more respective controllers 126 and non-volatile memory media 122. A device driver may provide access to the one or more non-volatile memory devices 120 via a traditional block I/O interface 131. Additionally, a device driver may provide access to enhanced functionality through the SCM interface 132. The metadata 135 may be used to manage and/or track data operations performed through any of the Block I/O interface 131, SCM interface 132, cache interface 133, or other, related interfaces.

The cache interface 133 may expose cache-specific features accessible via a device driver for the non-volatile memory device 120. Also, in some embodiments, the SCM interface 132 presented to the storage clients 116 provides access to data transformations implemented by the one or more non-volatile memory devices 120 and/or the one or more controllers 126.

A device driver may present a logical address space 134 to the storage clients 116 through one or more interfaces. As discussed above, the logical address space 134 may comprise a plurality of logical addresses, each corresponding to respective media locations of the one or more non-volatile memory devices 120. A device driver may maintain metadata 135 comprising any-to-any mappings between logical addresses and media locations, or the like.

A device driver may further comprise and/or be in communication with a non-volatile memory device interface 139 configured to transfer data, commands, and/or queries to the one or more non-volatile memory devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the controller 126 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The controller 126 is part of and/or in communication with one or more non-volatile memory devices 120. Although FIG. 1A depicts a single non-volatile memory device 120, the disclosure is not limited in this regard and could be adapted to incorporate any number of non-volatile memory devices 120.

The non-volatile memory device 120 may comprise one or more elements 123 of non-volatile memory media 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more elements 123 of non-volatile memory media 122, in certain embodiments, comprise storage class memory (SCM) (e.g., write in place memory, or the like).

While legacy technologies such as NAND flash may be block and/or page addressable, storage class memory, in one embodiment, is byte addressable (e.g., byte addressable for read, program/write, and/or erase operations; capable of byte addressable write in place operations without an erase operation; or the like). In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory elements 123 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 122 is referred to herein as "memory media," in various embodiments, the non-volatile memory media 122 may more generally comprise one or more non-volatile recording media capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, or the like. A controller 126 may be configured to manage data operations on the non-volatile memory media 122, and may comprise one or more processors, programmable processors (e.g., FPGAs), ASICs, micro-controllers, or the like. In some embodiments, the controller 126 is configured to store data on and/or read data from the non-volatile memory media 122, to transfer data to/from the non-volatile memory device 120, and so on.

The controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the controller 126 in parallel. This parallel access may allow the non-volatile memory elements 123 to be managed as a group, forming a logical memory element 129. The logical memory element may be partitioned into respective logical memory units (e.g., logical pages) and/or logical memory divisions (e.g., logical blocks). The logical memory units may be formed by logically combining physical memory units of each of the non-volatile memory elements.

The controller 126 may organize a block of word lines within a non-volatile memory element 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory element 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the computing device 110. A device driver may provide storage services to the storage clients 116 via one or more interfaces 131, 132, and/or 133. In some embodiments, a device driver provides a block-device I/O interface 131 through which storage clients 116 perform block-level I/O operations. Alternatively, or in addition, a device driver may provide a storage class memory (SCM) interface 132, which may provide other storage services to the storage clients 116. In some embodiments, the SCM interface 132 may comprise extensions to the block device interface 131 (e.g., storage clients 116 may access the SCM interface 132 through extensions or additions to the block device interface 131). Alternatively, or in addition, the SCM interface 132 may be provided as a separate API, service, and/or library. A device driver may be further configured to provide a cache interface 133 for caching data using the non-volatile memory system 102. A device driver may further comprise a non-volatile memory device interface 139 that is configured to transfer data, commands, and/or queries to the controller 126 over a bus 125, as described above.

Figure 1B:
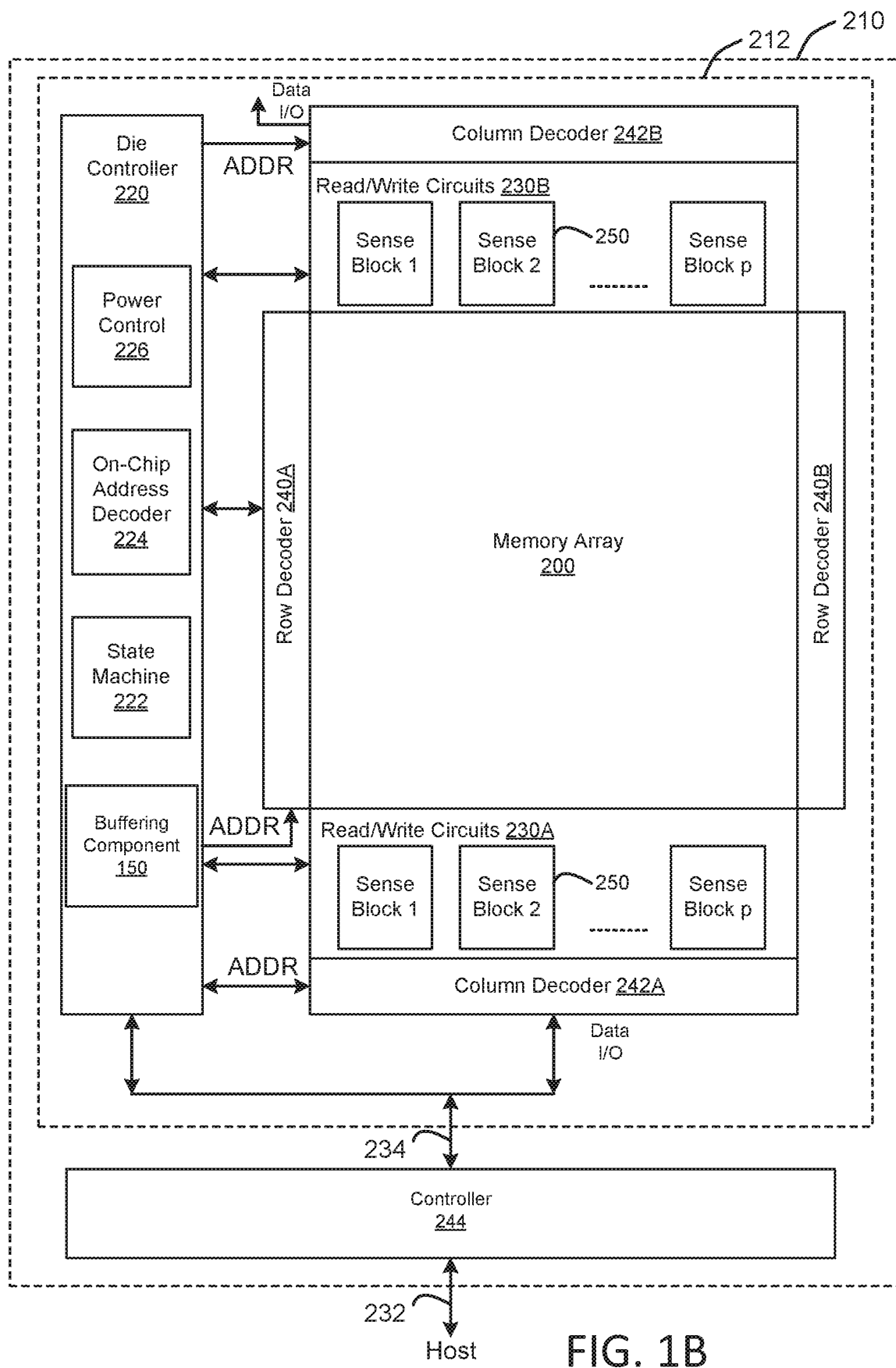
FIG. 1B is a schematic block diagram illustrating another embodiment of a system providing dynamic compaction for a garbage collection and/or folding process.

FIG. 1B illustrates an embodiment of a non-volatile storage device 210 that may include one or more memory die or chips 212. Memory die 212, in some embodiments, includes an array (two-dimensional or three dimensional) of memory cells 200, die controller 220, and read/write circuits 230A/230B. In one embodiment, access to the memory array 200 by the various peripheral circuits is implemented in a symmetric fashion, on opposite sides of the array, so that the densities of access lines and circuitry on each side are reduced by half. The read/write circuits 230A/230B, in a further embodiment, include multiple sense blocks 250 which allow a page of memory cells to be read or programmed in parallel.

The memory array 200, in various embodiments, is addressable by word lines via row decoders 240A/240B and by bit lines via column decoders 242A/242B. In some embodiments, a controller 244 is included in the same memory device 210 (e.g., a removable storage card or package) as the one or more memory die 212. Commands and data are transferred between the host and controller 244 via lines 232 and between the controller and the one or more memory die 212 via lines 234. One implementation may include multiple chips 212.

Die controller 220, in one embodiment, cooperates with the read/write circuits 230A/230B to perform memory operations on the memory array 200. The die controller 220, in various embodiments, includes a buffering component 150, a state machine 222, and an on-chip address decoder 224. In one embodiment, the state machine 222 comprises at least a portion of the buffering component 150. In further embodiments, the controller 244 comprises at least a portion of the buffering component 150. In various embodiments, one or more of the sense blocks 250 comprises at least a portion of the buffering component 150.

The buffering component 150, in one embodiment, is configured to identify a failure of a memory device during a multi-plane operation. In additional or alternative embodiments, the buffering component 150 is configured to perform an erase operation on one or more planes of the memory device and/or perform a program operation on one or more successfully erased planes of the memory device.

The state machine 222, in one embodiment, provides chip-level control of memory operations. The on-chip address decoder 224 provides an address interface to convert between the address that is used by the host or a memory controller to the hardware address used by the decoders 240A, 240B, 242A, and 242B. In certain embodiments, the state machine 222 includes an embodiment of the buffering component 150. The buffering component 150, in certain embodiments, is embodied as software in a device driver, hardware in a controller 244, and/or hardware in a die controller 220 and/or state machine 222.

In one embodiment, one or any combination of die controller 220, buffering component 150, decoder circuit 224, state machine circuit 222, decoder circuit 242A, decoder circuit 242B, decoder circuit 240A, decoder circuit 240B, read/write circuits 230A, read/write circuits 230B, and/or controller 244 may be referred to as one or more managing circuits.

Figure 2:
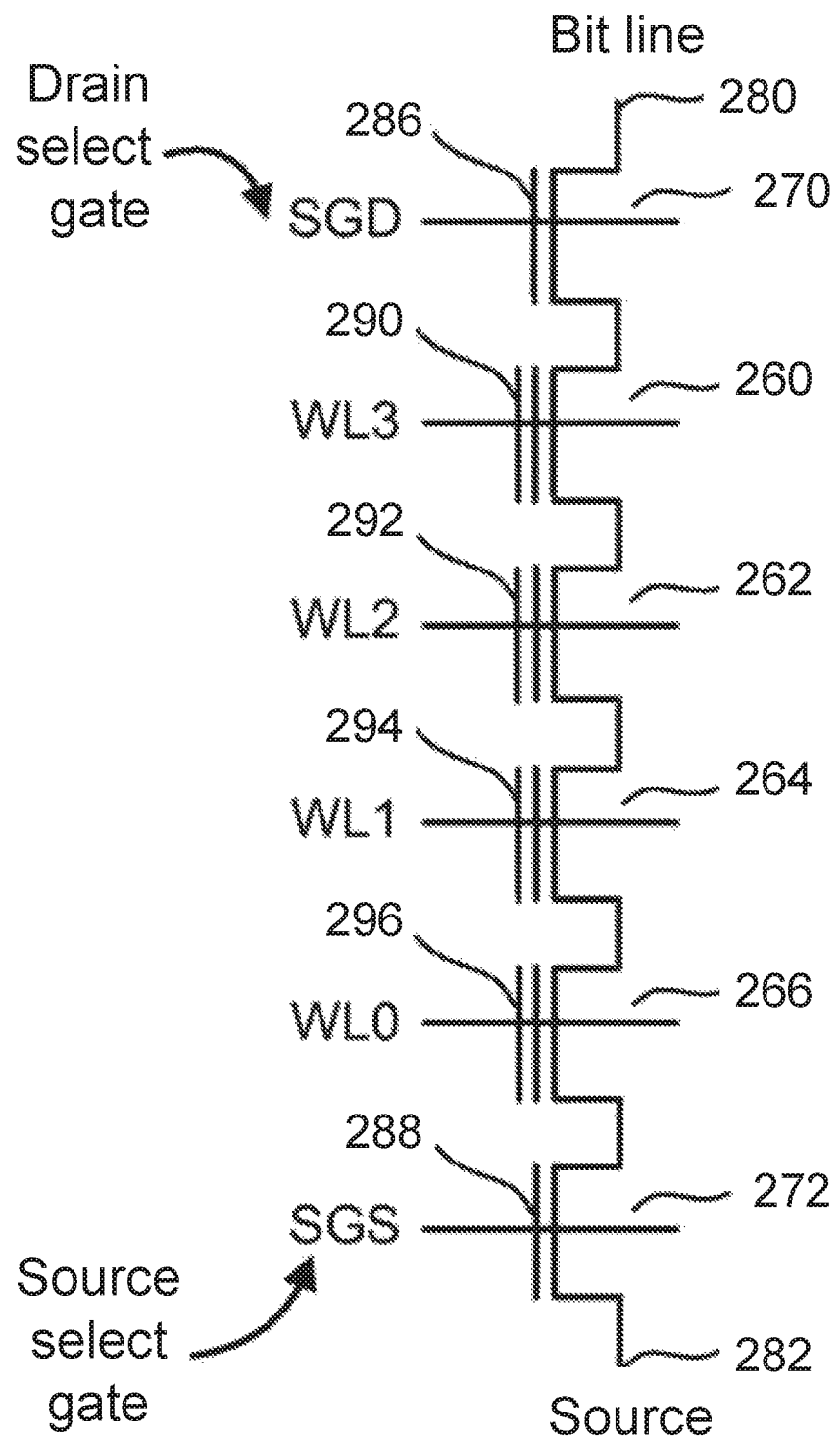
FIG. 2 is a schematic block diagram illustrating one embodiment of a string of storage cells.

FIG. 2 depicts one embodiment of a NAND string comprising a plurality of storage elements. The NAND string depicted in FIG. 2, in some embodiments, includes four transistors 260, 262, 264, and 266 connected in series and located between a first select transistor 270 and a second select transistor 272. In some embodiments, a transistor 260, 262, 264, and 266 includes a control gate and a floating gate. A control gate 290, 292, 294, and 296, in one embodiment, is connected to, or comprises a portion of, a word line. In a further embodiment, a transistor 260, 262, 264, and 266 is a storage element, storage cell, or the like, also referred to as a memory cell. In some embodiments, a storage element may include multiple transistors 260, 262, 264, and 266.

The first select transistor 270, in some embodiments, gates/connects the NAND string connection to a bit line 280 via a drain select gate SGD. The second select transistor 272, in certain embodiments, gates/connects the NAND string connection to a source line 282 via a source select gate SGS. The first select transistor 270, in a further embodiment, is controlled by applying a voltage to a corresponding select gate 286. The second select transistor 272, in some embodiments, is controlled by applying a voltage to corresponding select gate 288.

As shown in FIG. 2, the source line 282, in one embodiment, is connected to the sources of each transistor/storage cell 260, 262, 264, and 266 in the NAND string. The NAND string, in some embodiments, may include some storage elements 260, 262, 264, and 266 that have been programmed and some storage elements 260, 262, 264, and 266 that have not been programmed. As described in more detail below, the buffering component 150 and/or folding component 152 controls whether portions of a storage device, such as a NAND string, are used for buffering operations and/or folding operations, respectively.

Figure 3:
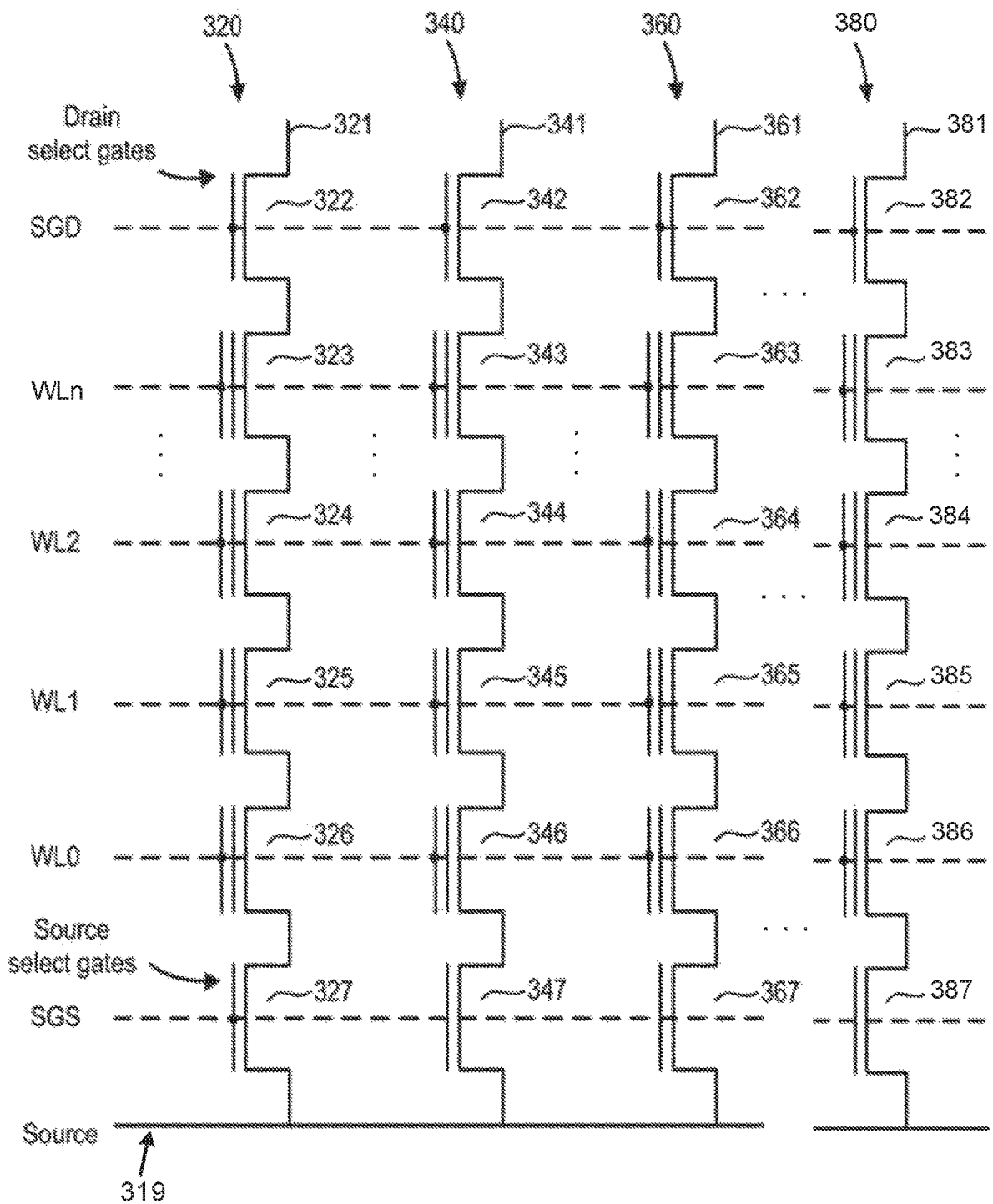
FIG. 3 is a schematic block diagram illustrating one embodiment of an array of storage cells.

FIG. 3 is a circuit diagram depicting a plurality of NAND strings 320, 340, 360, and 380. The architecture for a flash memory system using a NAND structure may include several NAND strings 320, 340, 360, and 380. For example, FIG. 3 illustrates NAND strings 320, 340, 360, and 380 in a memory array 200 that includes multiple NAND strings 320, 340, 360, and 380. In the depicted embodiment, each NAND string 320, 340, 360, and 380 includes drain select transistors 322, 342, 362, and 382, source select transistors 327, 347, 367, and 387, and storage elements 323-326, 343-346, 363-366, and 383-386. While four storage elements 323-326, 343-346, 363-366, and 383-386 per NAND string 320, 340, 360, and 380 are illustrated for simplicity, some NAND strings 320, 340, 360, and 380 may include any number of storage elements, e.g., thirty-two, sixty-four, or the like storage elements.

NAND strings 320, 340, 360, and 380, in one embodiment, are connected to a source line 319 by source select transistors 327, 347, 367, 387. A selection line SGS may be used to control the source side select transistors. The various NAND strings 320, 340, 360, and 380, in one embodiment, are connected to bit lines 321, 341, 361, 381 by drain select transistors 322, 342, 362, and 382. The drain select transistors 322, 342, 362, and 382 may be controlled by a drain select line SGD. In some embodiments, the select lines do not necessarily need to be in common among the NAND strings 320, 340, 360, and 380; that is, different select lines may be provided for different NAND strings 320, 340, 360, and 380.

As described above, each word line WL0-WLn comprises one or more storage elements 323-383, 324-384, 325-385, and 326-386. In the depicted embodiment, each bit line 321, 341, 361, 381 and the respective NAND string 320, 340, 360, and 380 comprise the columns of the memory array 200, storage block, erase block, or the like. The word lines WL0-WLn, in some embodiments, comprise the rows of the memory array 200, storage block, erase block, or the like. Each word line WL0-WLn, in some embodiments, connects the control gates of each storage element 323-383, 324-384, 325-385, and 326-386 in a row. Alternatively, the control gates may be provided by the word lines WL0-WLn themselves. In some embodiments, a word line WL0-WLn may include tens, hundreds, thousands, millions, or the like of storage elements 323-383, 324-384, 325-385, and 326-386.

In one embodiment, each storage element 323-326, 343-346, 363-366, and 383-386 is configured to store data. For example, when storing one bit of digital data, the range of possible threshold voltages ("VTH") of each storage element 323-326, 343-346, 363-366, and 383-386 may be divided into two ranges which are assigned logical data "1" and "0." In one example of a NAND type flash memory, the VTH may be negative after the storage elements 323-326, 343-346, 363-366, and 383-386 are erased, and defined as logic "1." In one embodiment, the VTH after a program operation is positive and defined as logic "0."

When the VTH is negative and a read is attempted, in some embodiments, storage elements 323-326, 343-346, 363-366, and 383-386 will turn on to indicate logic "1" is being stored. When the VTH is positive and a read operation is attempted, in a further embodiment, a storage element will not turn on, which indicates that logic "0" is stored. Each storage element 323-383, 324-384, 325-385, and 326-386 may also store multiple levels of information, for example, multiple bits of digital data. In such an embodiment, the range of VTH value is divided into the number of levels of data. For example, if four levels of information may be stored in each storage element 323-326, 343-346, 363-366, and 383-386, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage elements 323-326, 343-346, 363-366, and 383-386 and the threshold voltage ranges of the storage elements 323-326, 343-346, 363-366, and 383-386 depends upon the data encoding scheme adopted for the storage elements 323-326, 343-346, 363-366, and 383-386.

In some embodiments, portions of the storage elements 323-326, 343-346, 363-366, and 383-386 may be defective. In such an embodiment, the buffering component 150 and/or folding component 152 may manage which portions of the storage elements 323-326, 343-346, 363-366, and 383-386 are used for buffering operations and/or folding operations, respectively.

Figure 4:
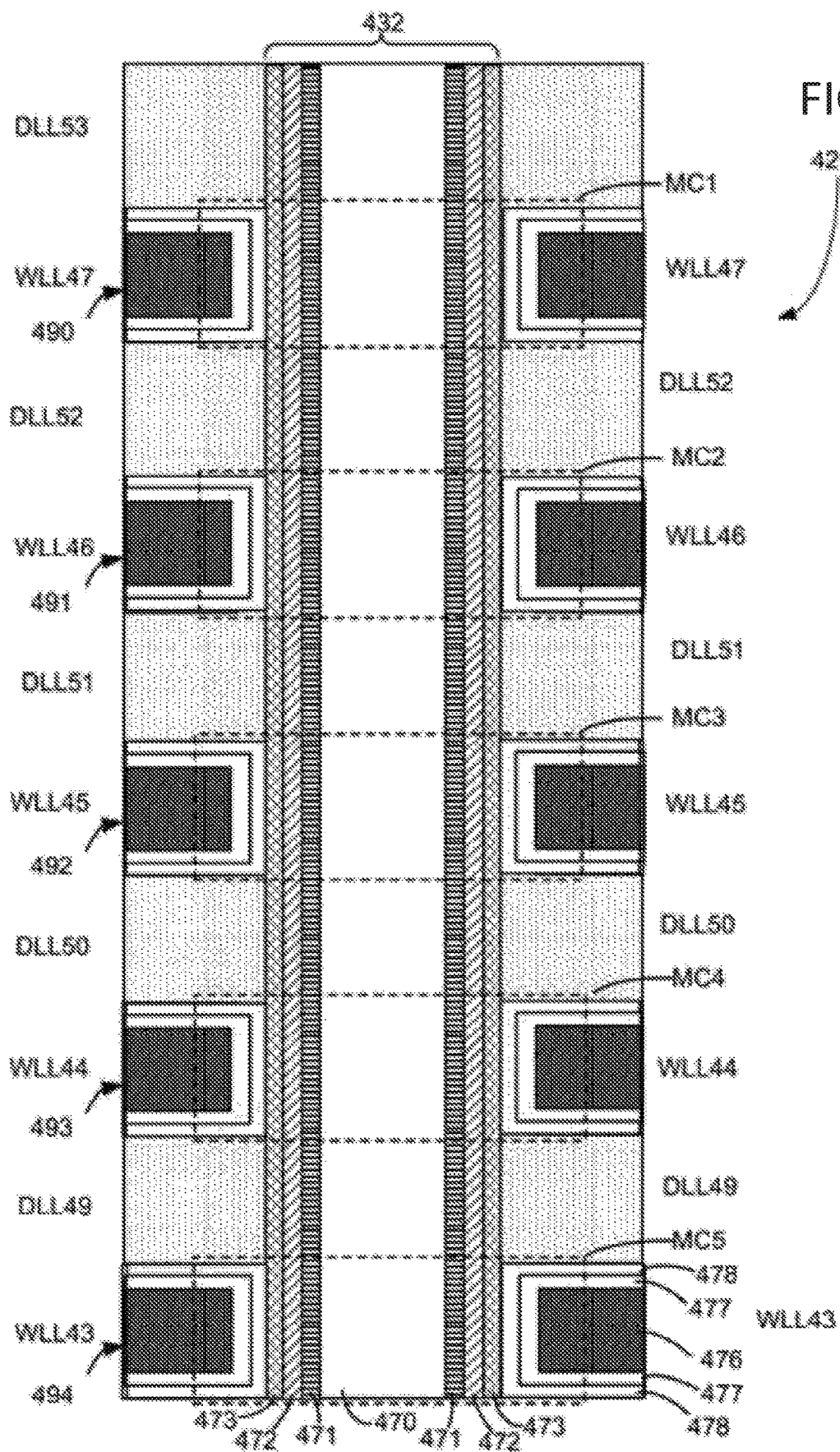
FIG. 4 is a schematic block diagram illustrating one embodiment of a three-dimensional (3-D), vertical NAND flash memory structure.

FIG. 4 illustrates one embodiment of a cross-sectional view of a 3D, vertical NAND flash memory structure 429 or string 429. In one embodiment, the vertical column 432 is round and includes four layers; however, in other embodiments more or less than four layers may be included and other shapes may be used (e.g., a "U" shape instead of an "I" shape or the like). In one embodiment, a vertical column 432 includes an inner core layer 470 that is made of a dielectric, such as SiO2. Other materials may also be used. Surrounding inner core 470 is polysilicon channel 471. Materials other than polysilicon may also be used. Note that it is the channel 471 that connects to the bit line. Surrounding channel 471 is a tunneling dielectric 472. In one embodiment, tunneling dielectric 472 has an ONO structure. Surrounding tunneling dielectric 472 is a shared charge-trapping layer 473, such as (for example) Silicon Nitride. Other materials and structures may also be used. The technology described herein is not limited to any particular material or structure.

FIG. 4 depicts dielectric layers DLL49, DLL50, DLL51, DLL52 and DLL53, as well as word line layers WLL43, WLL44, WLL45, WLL46, and WLL47. Each of the word line layers includes a word line region 476 surrounded by an aluminum oxide layer 477, which is surrounded by a blocking oxide (SiO2) layer 478. The physical interaction of the word line layers with the vertical column forms the memory cells. Thus, a memory cell, in one embodiment, comprises channel 471, tunneling dielectric 472, charge-trapping layer 473 (e.g., shared with other memory cells), blocking oxide layer 478, aluminum oxide layer 477 and word line region 476. In some embodiments, the blocking oxide layer 478 and aluminum oxide layer 477, may be replaced by a single layer of material with insulating properties or by more than 2 layers of different material with insulating properties. Furthermore, the materials used are not limited to silicon dioxide (SiO2) or aluminum oxide. For example, word line layer WLL47 and a portion of vertical column 432 comprise a memory cell MC1. Word line layer WLL46 and a portion of vertical column 432 comprise a memory cell MC2. Word line layer WLL45 and a portion of vertical column 432 comprise a memory cell MC3. Word line layer WLL44 and a portion of vertical column 432 comprise a memory cell MC4. Word line layer WLL43 and a portion of vertical column 432 comprise a memory cell MC5. In other architectures, a memory cell may have a different structure; however, the memory cell would still be the storage unit.

When a memory cell is programmed, electrons are stored in a portion of the charge-trapping layer 473 that is associated with the memory cell. These electrons are drawn into the charge-trapping layer 473 from the channel 471, through the tunneling dielectric 472, in response to an appropriate voltage on word line region 476. The threshold voltage (Vth) of a memory cell is increased in proportion to the amount of stored charge. In one embodiment, the programming is achieved through Fowler-Nordheim tunneling of the electrons into the charge-trapping layer. During an erase operation, the electrons return to the channel or holes are injected into the charge-trapping layer to recombine with electrons. In one embodiment, erasing is achieved using hole injection into the charge-trapping layer via a physical mechanism such as gate induced drain leakage (GIDL).

Storage cells in the same location or position in different memory structures 429 (e.g., different NAND strings 429) on different bit lines, in certain embodiments, may be on the same word line. Each word line may store one page of data, such as when 1-bit of data is stored per cell (SLC); two pages of data, such as when 2 or more bits of data are stored per cell (MLC); three pages of data, such as when 3-bits of data are stored per cell (TLC); four pages of data, such as when 4-bits of data are stored per cell (QLC); or another number of pages of data. As used herein, MLC may refer to one or more memory cells storing 2 bits per cell, 3 bits per cell, 4 bits per cell, or more (e.g., 2 or more bits per cell).

In the depicted embodiment, a vertical, 3D NAND flash memory structure 429 comprises an "I" shaped memory structure 429. In other embodiments, a vertical, 3D NAND flash memory structure 429 may comprise a "U" shaped structure, or may have another vertical and/or stacked architecture. In certain embodiments, four sets of strings 429 (e.g., four sets of 48 word lines, or another predefined number of word lines) may form an erase block, while in other embodiments, fewer or more than four sets of strings 429 may form an erase block. As may be appreciated, any suitable number of storage cells may be part of a single string 429. In one embodiment, a single string 429 includes 48 storage cells.

Figure 5:
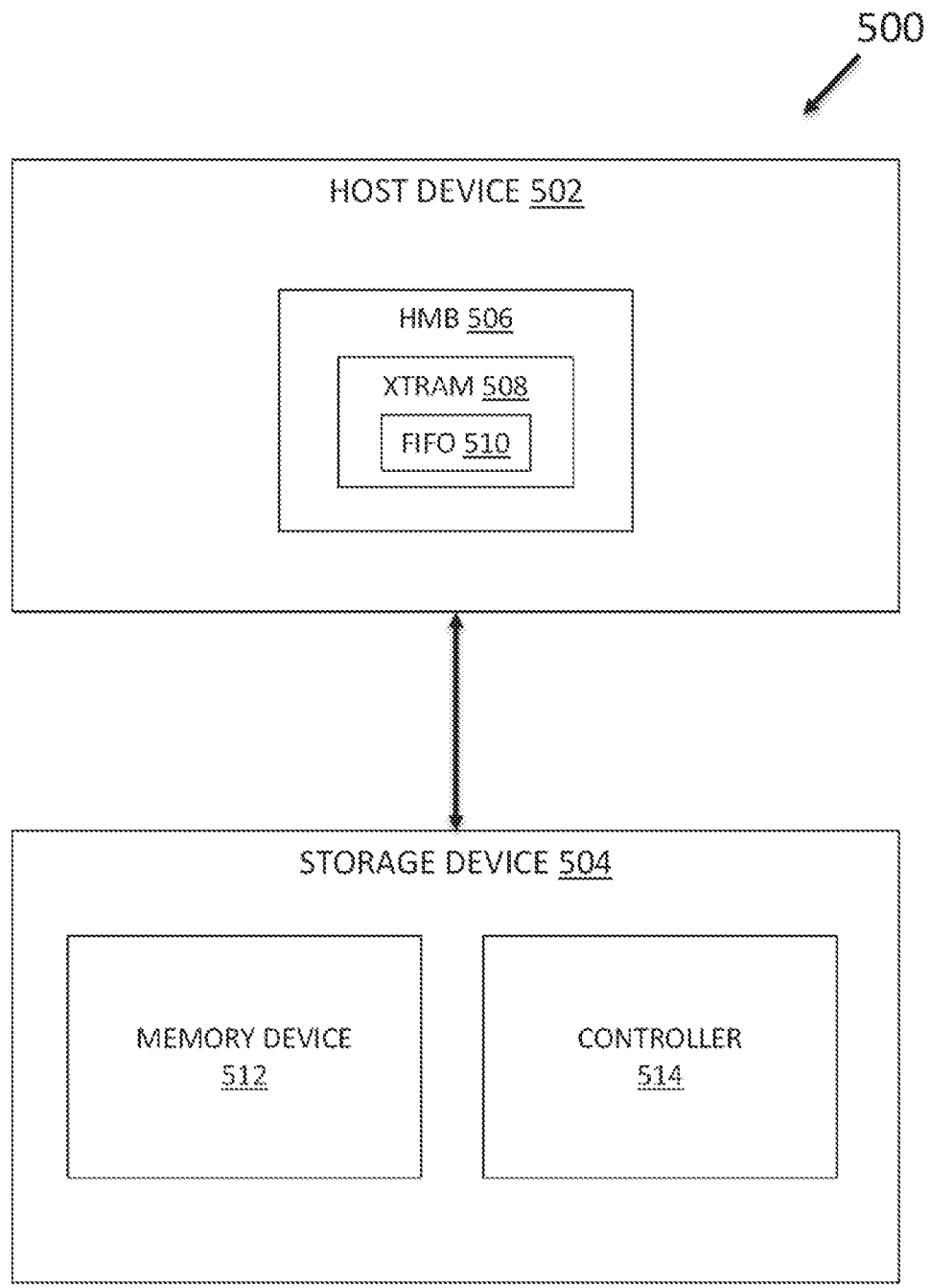
FIG. 5 is a block diagram of one embodiment of a storage network.

With reference to FIG. 5, FIG. 5 is a block diagram of one embodiment of a storage network 500. At least in the illustrated embodiment, the storage network 500 includes a host device 502 coupled to and/or in communication with a storage device 504.

A host device 502 may include any suitable hardware and/or hardware that can provide data, information resources, services, and/or applications to storage device 504, one or more other computing devices/nodes, and/or one or more users. At least in the illustrated embodiments, the host device 502 includes, among other components, a host memory buffer (HMB) 506 including an extended transfer random access memory (XTRAM) 508.

An HMB 506 may include any suitable memory that is known or developed in the future capable of storing and/or buffering data. In various embodiments, an HMB 506 can include random access memory (RAM) including, for example, static RAM (SRAM), dynamic RAM (DRAM, DIMM, RIMM, etc.), synchronous DRAM (SDRAM), double data rate SDRAM (DDR SDRAM, DDR2, DDR3, DDR4, etc.), Rambus DRAM (RDRAM), Graphics Double Data Rate Synchronous Dynamic RAM (GDDR SDRAM, GDDR2, GDDR3, GDDR4, GDDR5), and/or Flash Memory (e.g., NAND Flash memory), among other suitable types of memory that are possible and contemplated herein. In some embodiments, at least a portion of the HMB 506 is dedicated by the host device 502 for use by the storage device 504 (e.g., controller 514) to store data received from the host device 502 that is to be written to the storage device 504, data stored in the storage device 504 that is to be read to the host device 502, and/or metadata for data stored in the storage device 504 that is to be read to the host device 502.

In various embodiments, a portion of the HMB 506 that is dedicated for use by the storage device 504 is the XTRAM 508. In additional or alternative embodiments, the HMB 506 can further include a portion of a TRAM 604 (see e.g., FIGS. 6A and 6B), which can reduce the cost of the RAM in the storage device 504.

An XTRAM 508 may include any suitable size and/or comprise any suitable percentage of the storage space in the HMB 506. In some embodiments, the XTRAM 508 may include a size in the range of about 1 megabyte (MB) to about 5 MB, among other sizes/values that are possible and contemplated herein. That is, other embodiments of an XTRAM 508 may include a size greater than 5 MB or smaller than 1 MB. Thus, the various embodiments of the XTRAM 508 are not limited to a size in the range of 1 MB to 5 MB.

In additional or alternative embodiments, the XTRAM 508 may include a size sufficient to store/buffer at least two wordlines (2 WLs) worth of data. In the case of a Bit Cost Scalable (BiCS) Flash device, the XTRAM 508 may include a size sufficient to store/buffer the strings of at least 2 WLs (e.g., at least four strings). In some embodiments, the XTRAM 508 (or HMB 506) can operate/function as a staging buffer to back up host data transmitted to the storage device 504 until the host data is successfully programmed to a memory device 512 in the storage device 504. In additional or alternative embodiments, the XTRAM 508 (or HMB 506) can operate/function as a staging buffer for data stored in the memory device 512 that is to be read to the host device 502 until the host device 502 is available to receive the data. In further additional or alternative embodiments, the XTRAM 508 (or HMB 506) can operate/function as a staging buffer for metadata for the data stored in the memory device 512 that is to be read to the host device 502 until the controller 514 is available to transmit the data stored in the memory device 512 to the host device 502.

The XTRAM 508, in various embodiments, includes an I/O queue 510 for servicing I/O operations (e.g., read operations, write operations, etc.) corresponding to the data stored in the XTRAM 508. In some embodiments, the I/O queue 510 can be subject to a First In, First Out (FIFO) policy and/or protocol to service the read operations and/or write operations corresponding to the data and/or metadata buffered in the XTRAM 508, as discussed elsewhere herein.

In some embodiments, each task in the FIFO queue 510 includes a task ID and a data path to the data in the TRAM 604. The controller 514 can update a hardware queue status register (HW QSR) to tell the host device 502 where the data is located. The HW QSR can be used for read and/or write command/operations and can include an indicator/flag that identifies whether the I/O is a read operation or write operation.

In various embodiments, the I/O operations may be segregated either in time and/or in different queues. Using task IDs, data paths, and separate queues for read operations and write operations, the HW QSR can perform the various tasks substantially without a bottleneck. Further, this configuration can reduce the size and/or cost of the controller 514 because the controller can include a reduced amount of RAM, which can improve performance by masking at least some latencies experienced by the host device 502 and/or storage device 504.

The data for multiple I/O commands, in various embodiments, can be buffered into a TRAM 604 at the same time for fast operations since more TRAM 604 can be available in the HMB 506 (e.g., multiple 16K commands, etc.). In some embodiments, the HW QSR can still be updated for each task even if the TRAM 604 is buffered with data for multiple tasks with one or more interrupts of a few microseconds each. Further, with more TRAM 604 included in the HMB 506, 4 KB commands and commands larger than 4 KB can be serviced. For example, commands including a size of 8 KB and/or 16 KB can be serviced, among other sizes that are possible and contemplated herein.

In situations in which multiple Flash Transfer Layer (FTL) pages are buffered and/or parallel senses are possible (e.g., the device is operating very fast), the storage device 504 (controller 514) may be able to relatively quickly execute one or more (e.g., many) tasks from the I/O queue 510. At times, when the FTL page(s) are not buffered and the storage device 504 is slower, the FIFO policy can grow to absorb the latency, which can allow both the storage device 504 and the host device 502 to work independent of one another and mask at least some potential latency.

The storage device 504 may include any suitable hardware and/or software that is capable of storing host data. At least in the illustrated embodiment, the storage device 504 includes, among other components, a memory device 512 and a controller 514.

The memory device 512 may include any suitable hardware, firmware, and/or software that is capable of storing data. That is, the memory device 512 may be configured to have data written to and read from it. In various embodiments, the non-volatile memory device 512 may be similar to the non-volatile memory device 120 discussed elsewhere herein (see e.g., FIG. 1).

In some embodiments, the memory device 512 may include one or more elements of non-volatile memory media similar to elements 123 of the non-volatile memory media 122 discussed elsewhere herein. Specifically, the memory device 51 may include ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, SONOS, PMC, CBRAM, MRAM) magnetic storage media (e.g., hard disk, tape), optical storage media, or the like. In certain embodiments, the memory device 512 may include storage class memory (e.g., write in place memory, or the like).

A controller 514 may include any suitable hardware and/or software capable of buffering storage device data in an HMB 506 and/or an XTRAM 508. In some embodiments, a controller 514 may be configured to buffer data received from a host device 502 in an HMB 506 and/or an XTRAM 508 prior to writing the data to the memory device 512. In additional or alternative embodiments, a controller 514 may be configured to buffer data stored the memory device 512 in an HMB 506 and/or an XTRAM 508 prior to reading the data stored in the memory device 512 to the host device 502. In further additional or alternative embodiments, a controller 514 may be configured to buffer metadata for data stored the memory device 512 in an HMB 506 and/or an XTRAM 508 prior to reading the data stored in the memory device 512 to the host device 502.

Figure 6A:
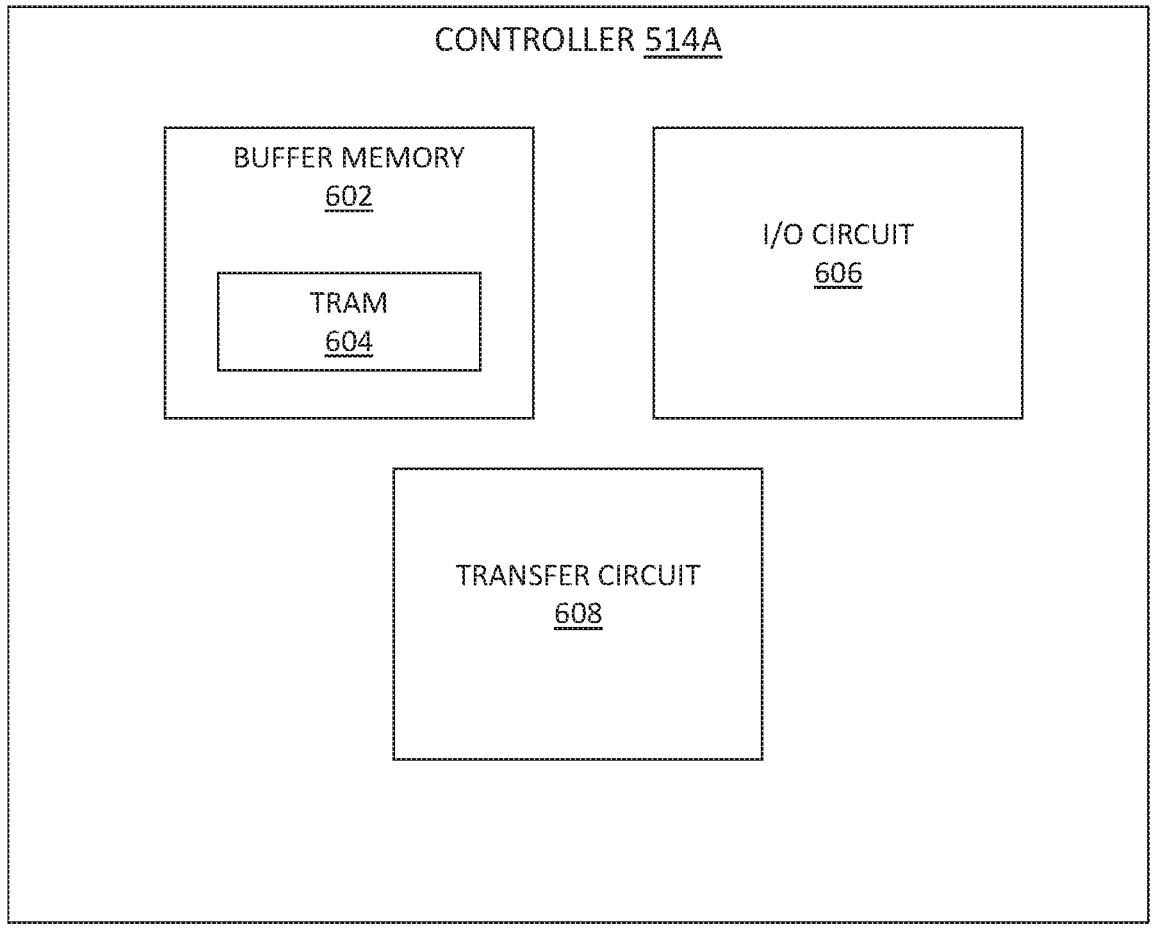
FIGS. 6A and 6B are block diagrams of various embodiments of a controller included in the storage network of FIG. 5.

Referring to FIG. 6A, FIG. 6A is a block diagram of one embodiment of a controller 514A. At least in the illustrated embodiment, a controller 514A can include, among other components, a buffer memory 602 including a transfer random access memory (TRAM) 604, an I/O circuit 606, and a transfer circuit 608.

A buffer memory 602 may include any suitable memory that is known or developed in the future capable of storing and/or buffering data. In various embodiments, an buffer memory 602 can include RAM including, for example, SRAM, DRAM (e.g., DIMM, RIMM, etc.), SDRAM, DDR SDRAM (e.g., DDR2, DDR3, DDR4, etc.), RDRAM, GDDR SDRAM (e.g., GDDR2, GDDR3, GDDR4, GDDR5), and/or Flash Memory (e.g., NAND Flash memory), among other suitable types of memory that are possible and contemplated herein. In some embodiments, at least a portion of the buffer memory 602 is dedicated for use by the controller 514 to store data received from the host device 502 that is to be written to the storage device 504, data stored in the storage device 504 that is to be read to the host device 502, and/or metadata for data stored in the storage device 504 that is to be read to the host device 502.

In various embodiments, a portion of the buffer memory 602 that is dedicated for use by the controller 514 for buffering data is the TRAM 604. A TRAM 604 may include any suitable size and/or comprise any suitable percentage of the storage space in the buffer memory 602. In some embodiments, the TRAM 604 may include a size in the range of about 1 MB to about 5 MB, among other sizes/values that are possible and contemplated herein. That is, other embodiments of a TRAM 604 may include a size greater than 5 MB or smaller than 1 MB. Thus, the various embodiments of the TRAM 604 are not limited to a size in the range of 1 MB to 5 MB.

In additional or alternative embodiments, the TRAM 604 may include a size sufficient to store/buffer at least 2 WLs worth of data. In the case of a BiCS Flash device, the TRAM 604 may include a size sufficient to store/buffer the strings of at least 2 WLs (e.g., at least four strings). In some embodiments, the TRAM 604 (or buffer memory 602) can operate/function as a staging buffer for host data transmitted to the storage device 504 until the host data is successfully programmed to a memory device 512 in the storage device 504. In additional or alternative embodiments, the TRAM 604 (or buffer memory 602) can operate/function as a staging buffer for data stored in the memory device 512 that is to be read to the host device 502 until the host device 502 is available to receive the data.

An I/O circuit 606 may include any suitable hardware and/or software that can receive I/O commands from the host device 502 and perform a corresponding I/O operation. In various embodiments, an I/O circuit 606 can receive write commands and/or read commands from the host device 502 and perform corresponding write operations and/or read operations. For example, an I/O circuit 606 can receive a write command from the host device 502 to write data to the storage device 504 (or memory device 512) and perform a write operation on the memory device 512. Similarly, an I/O circuit 606 can receive a read command from the host device 502 to read data stored on the memory device 512 and, in response thereto, perform a read operation to read the data stored on the memory device 512 to the host device 502.

A transfer circuit 608 may include any suitable hardware and/or software (e.g., a transfer engine) that can facilitate buffering data and/or metadata in buffer memory 602, TRAM 604, HMB 506, and/or XTRAM 508. In some embodiments, a transfer circuit 608 may be configured to facilitate buffering data received from a host device 502 in buffer memory 602 and/or TRAM 604 prior to writing the data to the memory device 512. In additional or alternative embodiments, a transfer circuit 608 may be configured to facilitate buffering data stored the memory device 512 in buffer memory 602 and/or TRAM 604 prior to reading the data stored in the memory device 512 to the host device 502.

In further additional or alternative embodiments, a transfer circuit 608 may be configured to facilitate buffering data received from a host device 502 in an HMB 506 and/or an XTRAM 508 prior to writing the data to the memory device 512. In still further additional or alternative embodiments, a transfer circuit 608 may be configured to facilitate buffering data stored the memory device 512 in an HMB 506 and/or an XTRAM 508 prior to reading the data stored in the memory device 512 to the host device 502. Here, the transfer circuit 608 may facilitate buffering the data stored the memory device 512 in the HMB 506 and/or XTRAM 508 prior to reading the data stored in the memory device 512 to the host device 502 in response to determining that the controller 514 includes a data transfer speed that is greater than the data transfer speed of the host device 502.

In yet further additional or alternative embodiments, a transfer circuit 608 may be configured to facilitate buffering metadata for data stored the memory device 512 in an HMB 506 and/or an XTRAM 508 prior to reading the data stored in the memory device 512 to the host device 502. Here, the transfer circuit 608 may facilitate buffering the metadata for the data stored the memory device 512 in the HMB 506 and/or XTRAM 508 prior to reading the data stored in the memory device 512 to the host device 502 in response to determining that the host device 502 includes a data transfer speed that is greater than the data transfer speed of the controller 514. In some embodiments, the metadata can include TASK_ID information and data path configuration information for the host device 502 to read the data stored in the memory device 512.

In various embodiments, the transfer circuit 608 and the I/O circuit 606 coordinate with one another to facilitate data exchange (e.g., I/O operations) between the storage device 504 and the host device 502. In some embodiments, the transfer circuit 608 facilitates buffering the data received from the host device 502 in the HMB 506 and/or XTRAM 508 until the I/O circuit 606 writes the data to the memory device 512. In additional or alternative embodiments, the transfer circuit 608 facilitates buffering the data received from the host device 502 in the HMB 506 and/or XTRAM 508 until the I/O circuit 606 indicates that the data has been to the memory device 512 without error and/or free from error.

In additional or alternative embodiments, the transfer circuit 608 facilitates buffering the data read requested by the host device 502 in the HMB 506 and/or XTRAM 508 until the I/O circuit 606 receives notification from the host device 502 that the host device 502 is available to receive the data. In further additional or alternative embodiments, the transfer circuit 608 facilitates buffering the metadata for the data read requested by the host device 502 in the HMB 506 and/or XTRAM 508 until the transfer circuit 608 receives notification from the I/O circuit 606 that the I/O circuit 606 (or controller 514) is available to transfer the read requested data to the host device 502.

In some embodiments, if the storage device 504 receives a write command for data that is being buffered in the HMB

506 and/or XTRAM 508 in response to a read command, the transfer circuit 608 can include a single search engine (SSE) that maintains a list of data that the host device 502 is writing to the storage device 504 and the transfer circuit 608 can redirect reading the data from the storage device 504 (e.g., an FTL). Further, the transfer circuit 608 can handle situations in which part of the read data is in the HMB 506 and/or XTRAM 508 and part in the memory device 512 by waiting to read the data until the data has been written to the memory device 512.

Figure 6B:
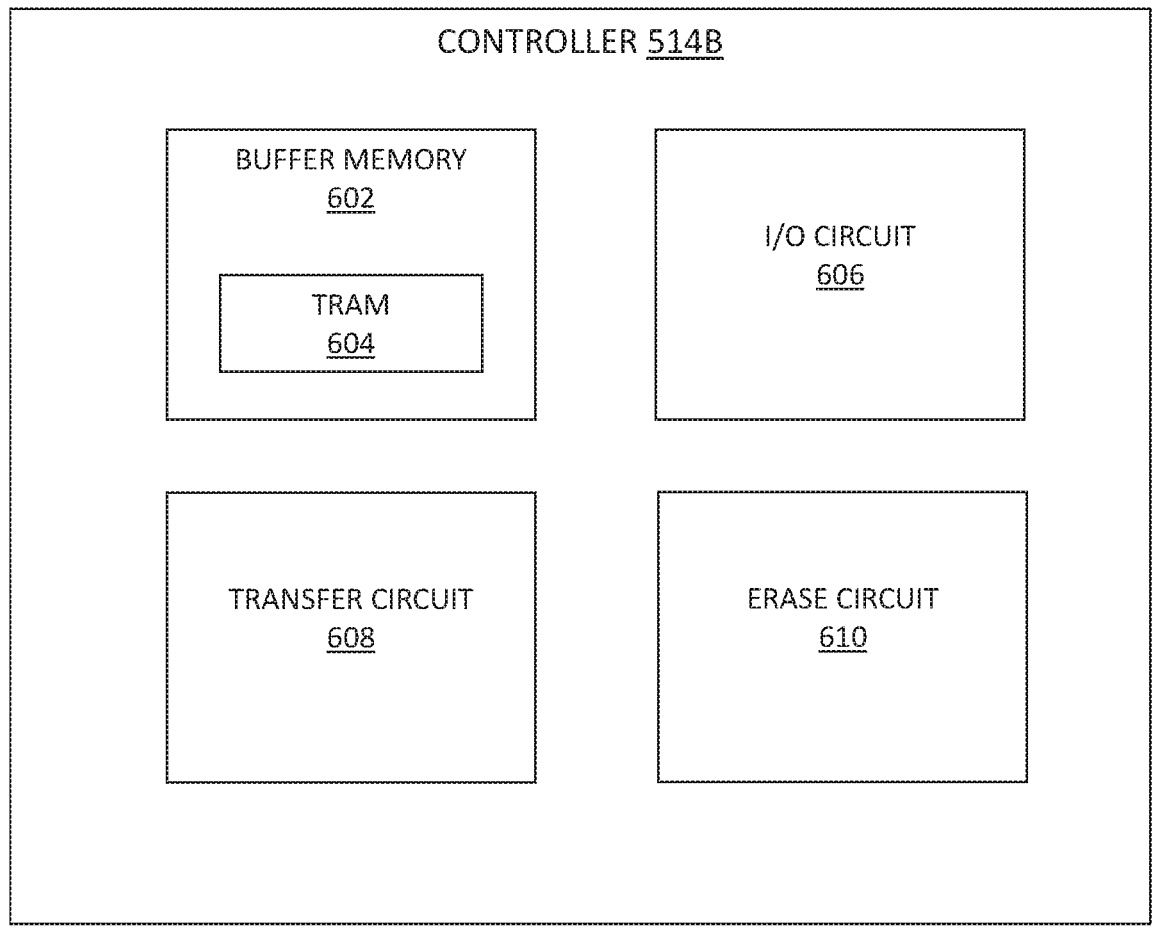

With reference to FIG. 6B, FIG. 6B is a block diagram of another embodiment of a controller 514B. At least in the illustrated embodiment, a controller 514B can include a buffer memory 602 including a transfer random access memory (TRAM) 604, an I/O circuit 606, and a transfer circuit 608 similar to the controller 512A discussed elsewhere herein. In addition, a controller 514B can further includes, among other components, an erase circuit 610.

An erase circuit 610 may include any suitable hardware and/or software that can facilitate erasing data and/or metadata from an HMB 506 and/or XTRAM 508. In some embodiments, an erase circuit 610 can facilitate erasing data from an HMB 506 and/or XTRAM 508 in response to receiving a notification and/or indication that the data received from the host device 502 has been written to the memory device 512 free from error. In additional or alternative embodiments, an erase circuit 610 can facilitate erasing data from an HMB 506 and/or XTRAM 508 in response to receiving a notification and/or indication that the requested data has been successfully read to the host device 502 from the storage device 504. In further additional or alternative embodiments, an erase circuit 610 can facilitate erasing metadata for requested read data from an HMB 506 and/or XTRAM 508 in response to receiving a notification and/or indication that the requested data has been successfully read to the host device 502 from the storage device 504.

In the various embodiments of host device 502, storage device 504, controller 514A, and/or 514B, the data is at least temporarily stored in the HMB 506 and/or XTRAM 508 to ensure that there is a backup copy of the write data received from the host device 502 that is being written to the memory device 512. Further, the data is at least temporarily stored in the HMB 506 and/or XTRAM 508 to ensure that there is a backup copy of the read data that is being read to the host device 514. Further still, the metadata is at least temporarily stored in the HMB 506 and/or XTRAM 508 to ensure that there is a backup of the read data that is being read to the host device 514.

For example, the data for a wordline (WLn) and a previous wordline (WLn−1) can be buffered in the HMB 506 and/or XTRAM 508 until the data is successfully programmed to the memory device 512. In some embodiments, the HMB 506 and/or XTRAM 508 may be considered a rolling buffer in which WLn−1 is erased and WLn is moved as the new WLn−1 and a new WLn is buffered in the HMB 506 and/or XTRAM 508. This process may be performed for each open block and across all of the planes (for plane to plane shorts) in the memory device 512. A rolling buffer can minimize the amount of controller RAM that is needed and/or eliminated the need for XRAM, as well as hardware complexity (e.g., an XOR engine is not needed).

Figure 7:
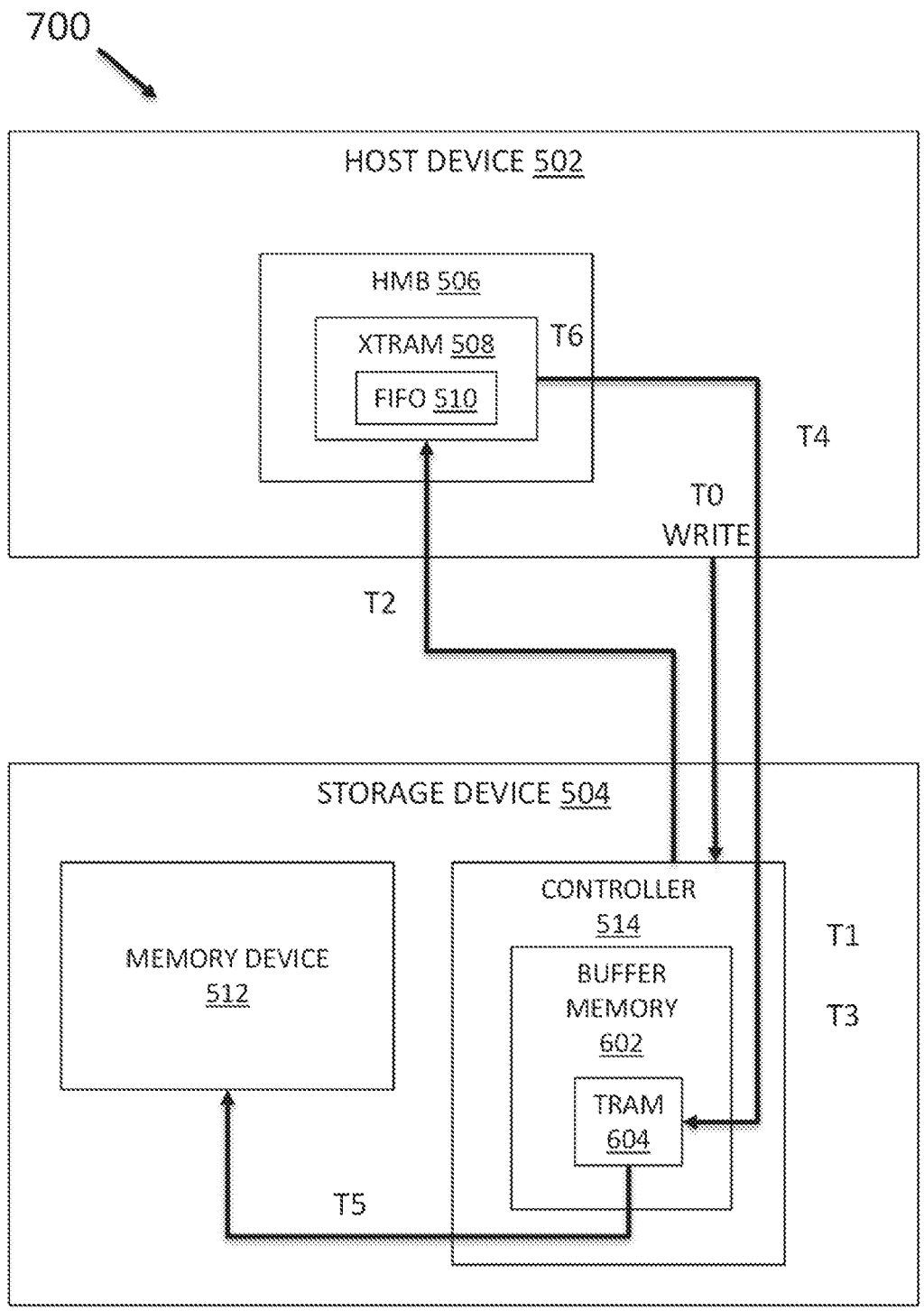
FIG. 7 is a flow diagram of one embodiment of write operations in the storage network of FIG. 5.

With reference to FIG. 7, FIG. 7 is a flow diagram 700 of one embodiment of write operations in the storage network 500. At least in the illustrated embodiment, at time T0 the host device 502 transmits a command (e.g., a write command) to write data to the storage device 504 (e.g., memory device 512).

At time T1, the controller 514 can determine if the buffer memory 602 and/or TRAM 604 is full, substantially full, and/or is buffering greater than or equal to a predetermined amount/percentage of data. In response to determining that the buffer memory 602 and/or TRAM 604 is full, substantially full, and/or is buffering greater than or equal to the predetermined amount/percentage of data, the controller 514 transmits and/or facilitates transmission of the data in the write command to an HMB 506 and/or XTRAM 508 at time T2.

The controller 514, at time T3, can determine that the buffer memory 602 and/or TRAM 604 is no longer full, substantially full, and/or is buffering less than the predetermined amount/percentage of data. In response to such determination, the controller 514 can transfer the data buffered in the HMB 506 and/or XTRAM 508 to the buffer memory 602 and/or TRAM 604 at time T4.

At time T5, the controller 514 can write the data in the buffer memory 602 and/or TRAM 604 to the memory device 512. Further, the controller 514, in response to determining that the write data is stored in the memory device 512 without error, can facilitate erasing the write data from the HMB 506 and/or XTRAM 508.

Figure 8:
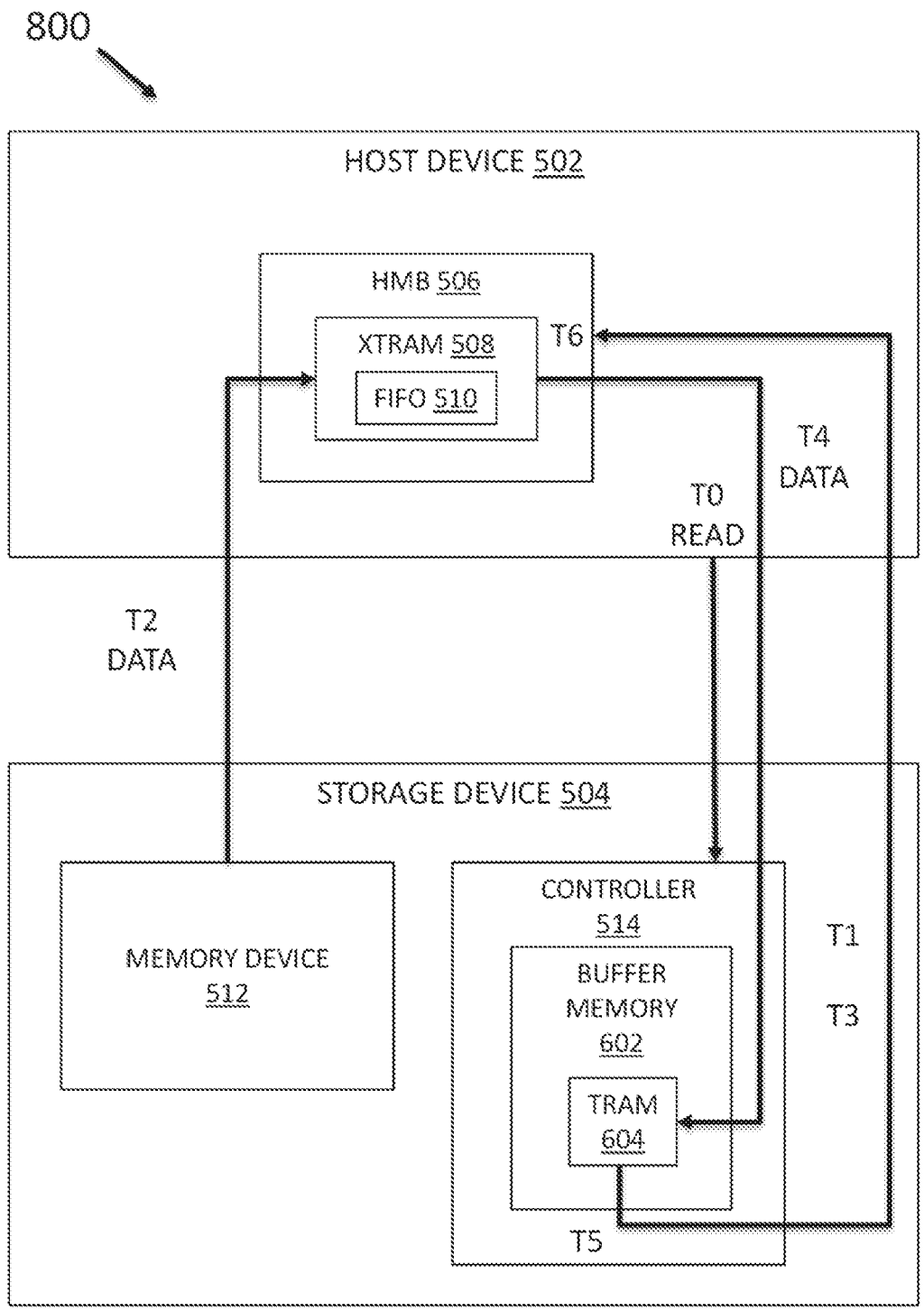
FIG. 8 is a flow diagram of one embodiment of read operations in the storage network of FIG. 5.

Referring to FIG. 8, FIG. 8 is a flow diagram 800 of one embodiment of read operations in the storage network 500 when a storage device 504 (or controller 514) includes a data transfer speed that is greater (e.g., faster) than the data transfer speed of a host device 502. At least in the illustrated embodiment, at time T0 the host device 502 transmits a command (e.g., a read command) to read data from the storage device 504 (e.g., memory device 512).

At time T1, the controller 514 can determine if the buffer memory 602 and/or TRAM 604 is full, substantially full, and/or is buffering greater than or equal to a predetermined amount/percentage of data. In response to determining that the buffer memory 602 and/or TRAM 604 is full, substantially full, and/or is buffering greater than or equal to the predetermined amount/percentage of data, the controller 514 transmits and/or facilitates transmission of the data in the read command to from the memory device 512 to an HMB 506 and/or XTRAM 508 at time T2.

The controller 514, at time T3, can determine that the buffer memory 602 and/or TRAM 604 is no longer full, substantially full, and/or is buffering less than the predetermined amount/percentage of data. In response to such determination, the controller 514 can transfer the data buffered in the HMB 506 and/or XTRAM 508 to the buffer memory 602 and/or TRAM 604 at time T4.

At time T5, the controller 514 can read the data in the buffer memory 602 and/or TRAM 604 to the host device 502 in response to determining that the host device 502 is available to receive such read data. Further, the controller 514, in response to determining that the data has been read to the host device 502 without error, can facilitate erasing the read data from the HMB 506 and/or XTRAM 508.

Figure 9:
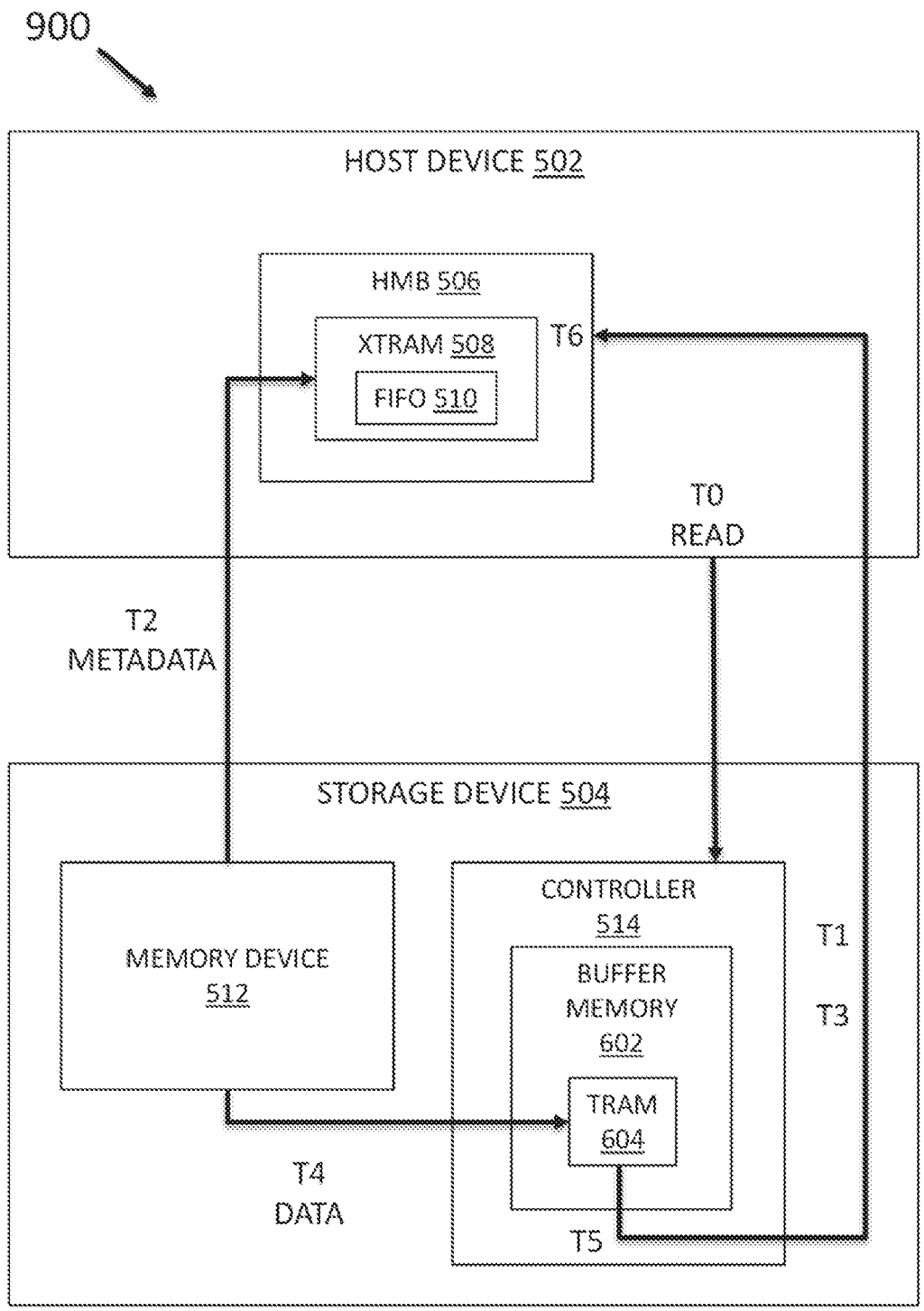
FIG. 9 is a flow diagram of another embodiment of read operations in the storage network of FIG. 5.

Referring to FIG. 9, FIG. 9 is a flow diagram 900 of one embodiment of read operations in the storage network 500 when a storage device 504 (or controller 514) includes a data transfer speed that is less (e.g., slower) than the data transfer speed of a host device 502 (e.g., a host interface is fast (e.g., 32 giga-transactions per second, 4 gigabytes per second and the storage device 504 operates at 800 MB per second). At least in the illustrated embodiment, at time T0 the host device 502 transmits a command (e.g., a read command) to read data from the storage device 504 (e.g., memory device 512).

At time T1, the controller 514 can determine if the buffer memory 602 and/or TRAM 604 is full, substantially full, and/or is buffering greater than or equal to a predetermined amount/percentage of data. In response to determining that the buffer memory 602 and/or TRAM 604 is full, substantially full, and/or is buffering greater than or equal to the predetermined amount/percentage of data, the controller 514 transmits and/or facilitates transmission of metadata for the data in the read command to an HMB 506 and/or XTRAM 508 at time T2.

The controller 514, at time T3, can determine that the buffer memory 602 and/or TRAM 604 is no longer full, substantially full, and/or is buffering less than the predetermined amount/percentage of data. In response to such determination, the controller 514 can transfer the data in the memory device 512 to the buffer memory 602 and/or TRAM 604 at time T4.

At time T5, the controller 514 can read the data in the buffer memory 602 and/or TRAM 604 to the host device 502. Further, the controller 514, in response to determining that the data has been read to the host device 502 without error, can facilitate erasing the metadata from the HMB 506 and/or XTRAM 508.

Figure 10:
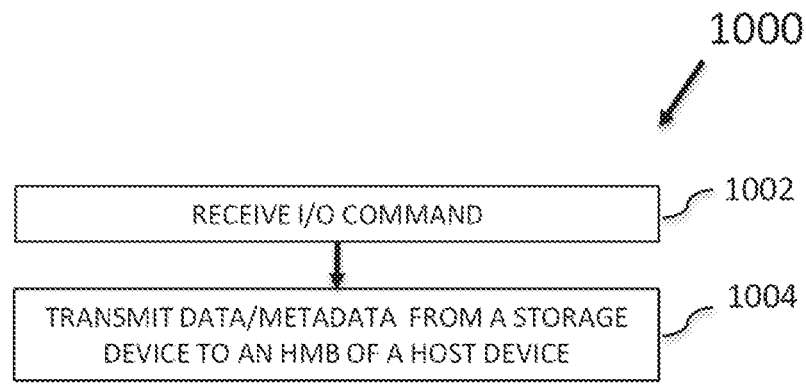
FIG. 10 is a schematic flow chart diagram illustrating one embodiment of a method for buffering storage device data in a host memory buffer (HMB)

With reference to FIG. 10, FIG. 10 is a schematic flow chart diagram illustrating one embodiment of a method 1000 for buffering storage device data in an HMB. At least in the illustrated embodiment, method 1000 can begin by a storage device 504 receiving an I/O command (e.g., write command, read command, etc.) from a host device 502 (block 1002).

In response to the I/O command, the method 1000 can continue by transmitting data and/or metadata to an HMB 506 and/or XTRAM 508 of the host device 502 (block 1004). In some embodiments, the data transmitted to the HMB 506 and/or XTRAM 508 can be data received from the host device 502 that is to be written to the storage device 504 (e.g., memory device 512). In additional or alternative embodiments, the data transmitted to the HMB 506 and/or XTRAM 508 can be data that is stored in the storage device 504 (e.g., memory device 512) and requested to be read by the host device 502. In further additional or alternative embodiments, the metadata transmitted to the HMB 506 and/or XTRAM 508 can be metadata for the data that is stored in the storage device 504 (e.g., memory device 512) and requested to be read by the host device 502.

Figure 11:
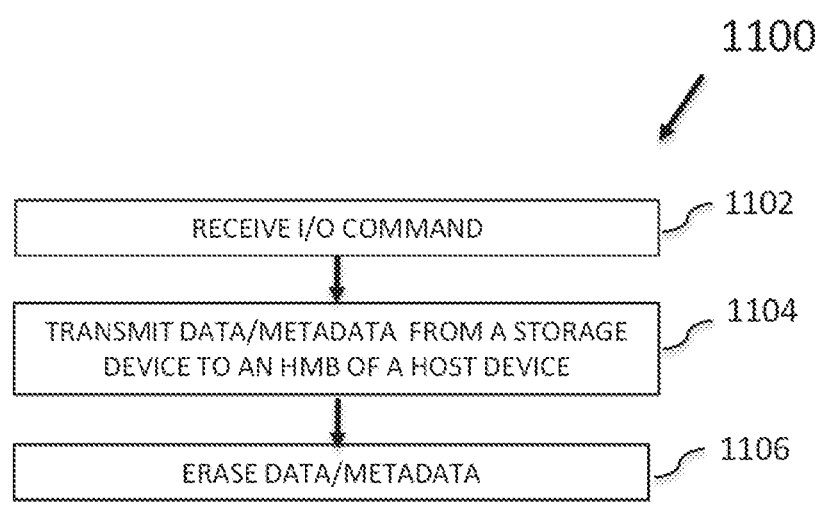
FIG. 11 is a schematic flow chart diagram illustrating another embodiment of a method for buffering storage device data in an HMB.

Referring to FIG. 11, FIG. 11 is a schematic flow chart diagram illustrating another embodiment of a method 1100 for buffering storage device data in an HMB. At least in the illustrated embodiment, method 1100 can begin by a storage device 504 receiving an I/O command (e.g., write command, read command, etc.) from a host device 502 (block 1102).

In response to the I/O command, the method 1100 can continue by transmitting data and/or metadata to an HMB 506 and/or XTRAM 508 of the host device 502 (block 1104). In some embodiments, the data transmitted to the HMB 506 and/or XTRAM 508 can be data received from the host device 502 that is to be written to the storage device 504 (e.g., memory device 512). In additional or alternative embodiments, the data transmitted to the HMB 506 and/or XTRAM 508 can be data that is stored in the storage device 504 (e.g., memory device 512) and requested to be read by the host device 502. In further additional or alternative embodiments, the metadata transmitted to the HMB 506 and/or XTRAM 508 can be metadata for the data that is stored in the storage device 504 (e.g., memory device 512) and requested to be read by the host device 502.

The method 1100 can further include erasing the data and/or metadata from the HMB 506 and/or XTRAM 508. In some embodiments, the data is erased from the HMB 506 and/or XTRAM 508 in response to receiving a notification and/or indication that the data received from the host device 502 has been written to the memory device 512 free from error. In additional or alternative embodiments, the data is erased from the HMB 506 and/or XTRAM 508 in response to receiving a notification and/or indication that the requested data has been successfully read to the host device 502 from the storage device 504. In further additional or alternative embodiments, the metadata data is erased from the HMB 506 and/or XTRAM 508 in response to receiving a notification and/or indication that the requested data has been successfully read to the host device 502 from the storage device 504.

Figure 12:
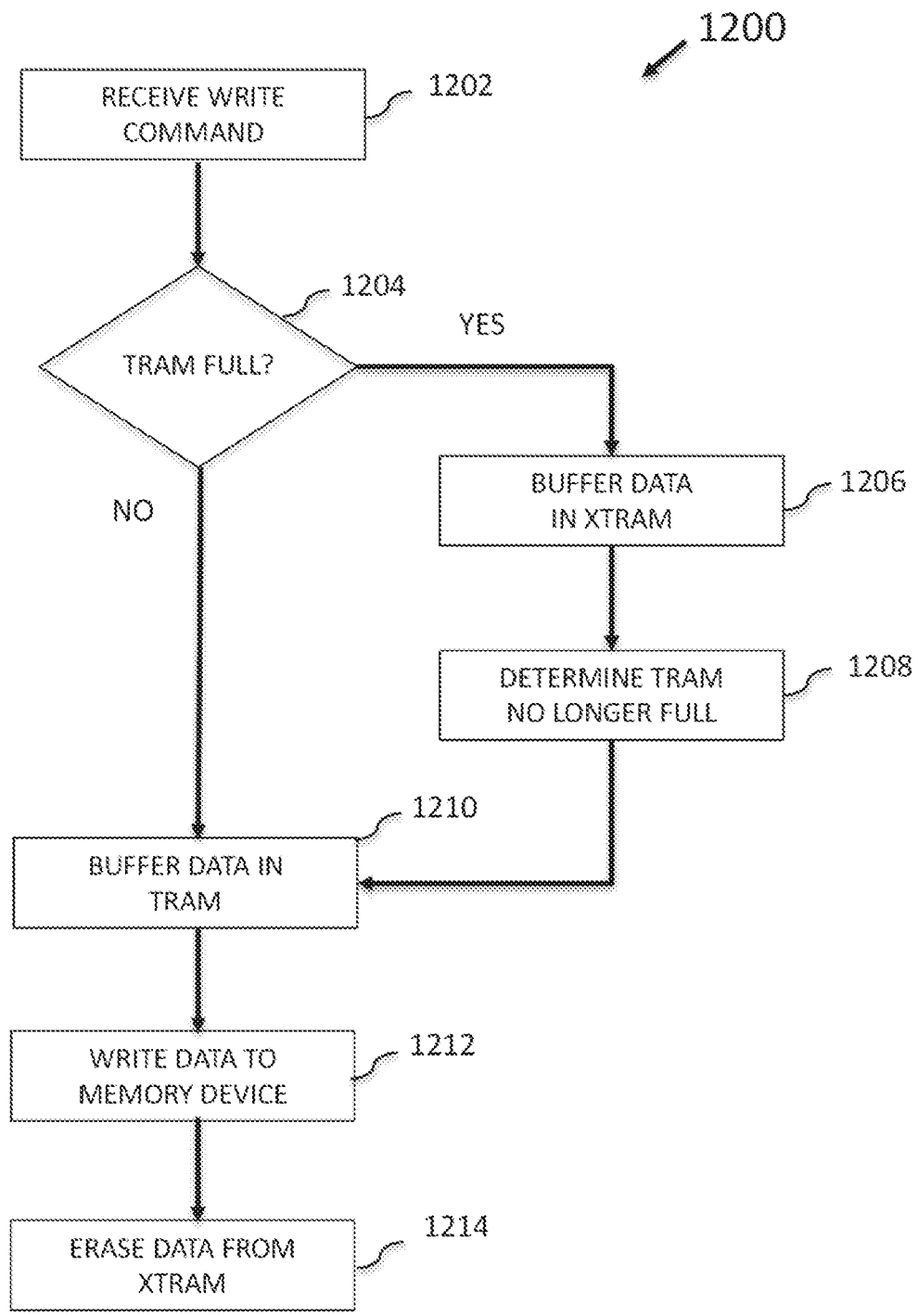
FIG. 12 is a schematic flow chart diagram illustrating yet another embodiment of a method for buffering storage device data in an HMB.

With reference to FIG. 12, FIG. 12 is a schematic flow chart diagram illustrating one embodiment of a method 1200 for buffering storage device data in an HMB. At least in the illustrated embodiment, method 1200 can begin by a storage device 504 receiving a write command from a host device 502 (block 1202).

The storage device 504 (e.g., controller 514) can determine if a TRAM 604 is full, substantially full, and/or includes greater than or equal to a predetermined amount and/or percentage of data (block 1204). In response to determining that the TRAM 604 is full, substantially full, and/or includes greater than or equal to a predetermined amount and/or percentage of data (e.g., a "YES" in block 1204), the data in the write command is buffered in an XTRAM 508 (block 1206). The method 1200 can subsequently determine that the TRAM 604 is no longer is full, substantially full, and/or includes greater than or equal to a predetermined amount and/or percentage of data (block 1208) and buffer the data in the XTRAM 508 in the TRAM 604 (block 1210).

In response to determining that the TRAM 604 is not full, substantially full, and/or includes greater than or equal to a predetermined amount and/or percentage of data (e.g., a "NO" in block 1204), the data in the write command is buffered in the TRAM 508 (block 1210). Subsequently, the data buffered in the TRAM 604 is written to a memory device 512 (block 1212).

The data buffered in the XTRAM 508 may subsequently be erased (block 1214). In some embodiments, the data is erased from the XTRAM 508 in response to receiving a notification and/or indication that the data received from the host device 502 has been written to the memory device 512 free from error.

Figure 13:
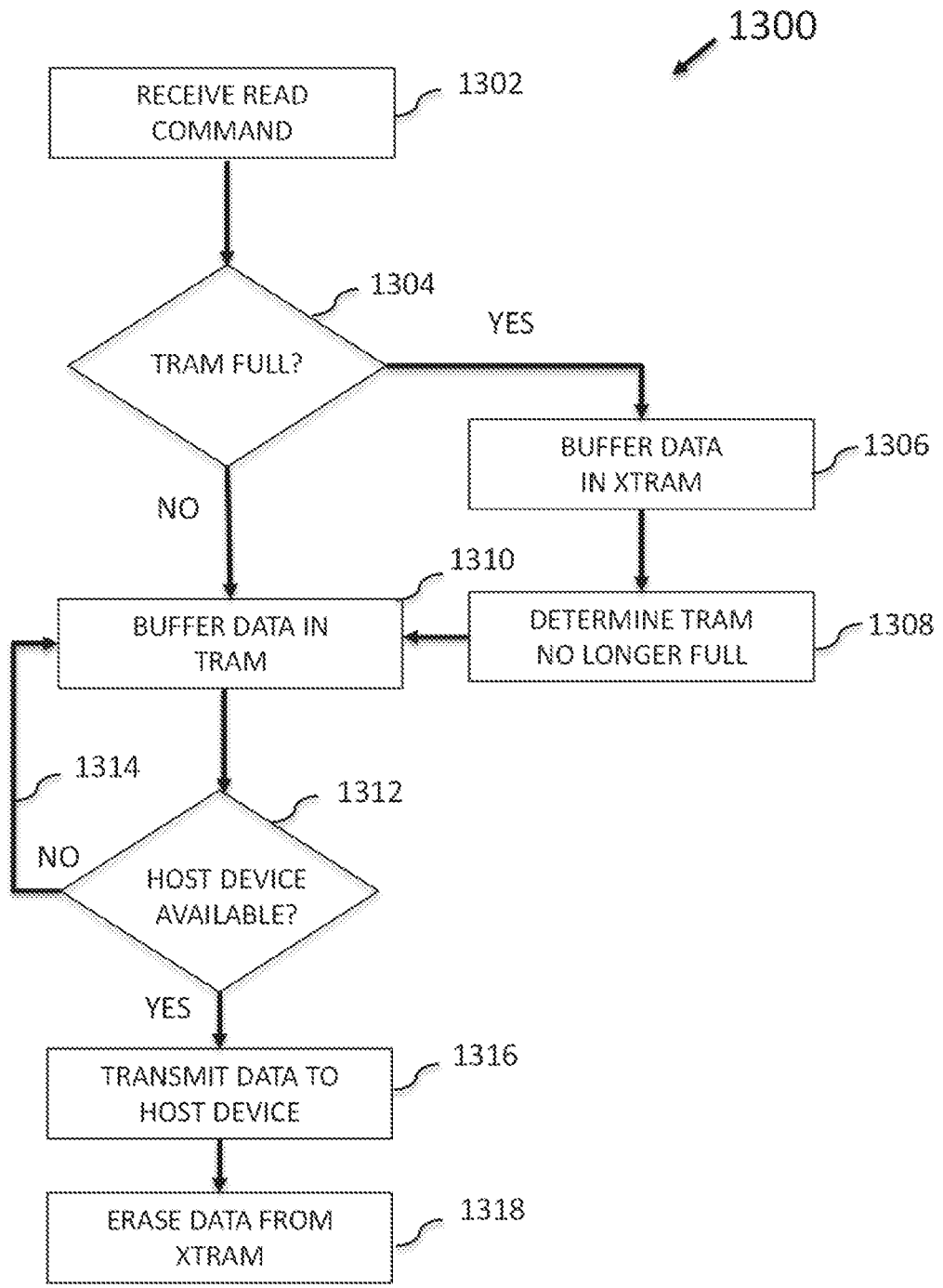
FIG. 13 is a schematic flow chart diagram illustrating still another embodiment of a method for buffering storage device data in an HMB.

Referring to FIG. 13, FIG. 13 is a schematic flow chart diagram illustrating another embodiment of a method 1300 for buffering storage device data in an HMB when a storage device 504 includes a data transfer speed that is greater than the data transfer speed of a host device 502. At least in the illustrated embodiment, method 1300 can begin by the storage device 504 receiving a read command from the host device 502 (block 1302).

The storage device 504 (e.g., controller 514) can determine if a TRAM 604 is full, substantially full, and/or includes greater than or equal to a predetermined amount and/or percentage of data (block 1304). In response to determining that the TRAM 604 is full, substantially full, and/or includes greater than or equal to a predetermined amount and/or percentage of data (e.g., a "YES" in block 1304), the data requested in the read command is buffered from a memory device 512 to an XTRAM 508 (block 1306). The method 1300 can subsequently determine that the TRAM 604 is no longer is full, substantially full, and/or includes greater than or equal to a predetermined amount and/or percentage of data (block 1308) and buffer the data in the XTRAM 508 in the TRAM 604 (block 1310). Here, when the TRAM 604 is no longer is full, substantially full, and/or includes greater than or equal to a predetermined amount and/or percentage of data, storage priority in the TRAM 604 is given to the data buffered in the XTRAM 508.

In response to determining that the TRAM 604 is not full, substantially full, and/or includes greater than or equal to a predetermined amount and/or percentage of data (e.g., a "NO" in block 1304), the data requested in the read command is buffered in the TRAM 508 (block 1310). Subsequently, the storage device 504 (e.g., controller 514) can determine if the host device 502 is available to receive the requested data that is being buffered in the TRAM 604 (block 1312).

In response to determining that the host device is unavailable (e.g., a "NO" is block 1312), the data remains buffered in the TRAM 604 (return 1314). In response to determining that the host device is available (e.g., a "YES" is block 1312), the data buffered in the TRAM 604 is transmitted to the host device 502 (block 1316).

The data buffered in the XTRAM 508 may subsequently be erased (block 1318). In some embodiments, the data is erased from the XTRAM 508 in response to receiving a notification and/or indication that the data has been read to the host device 502 free from error.

Figure 14:
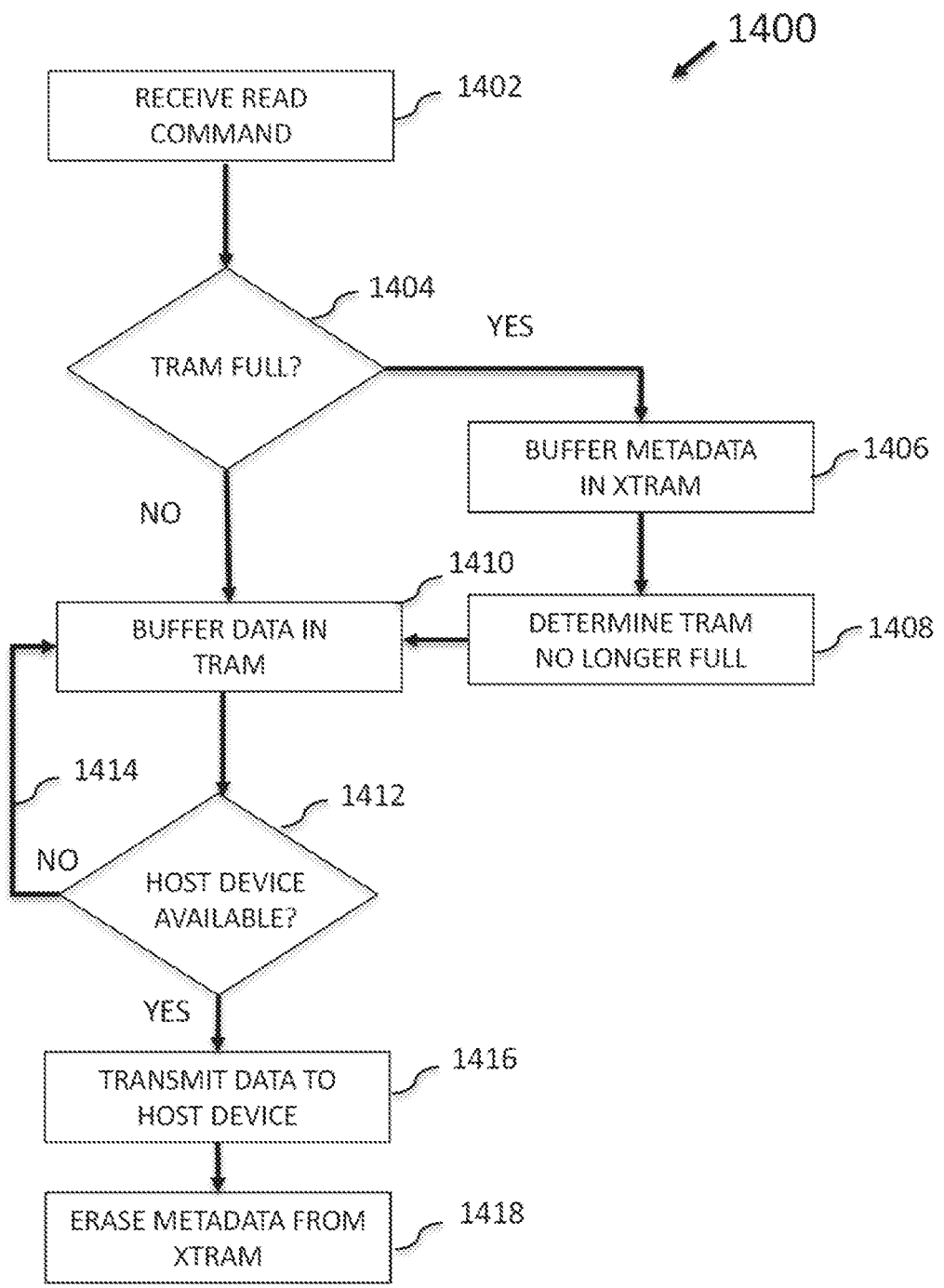
FIG. 14 is a schematic flow chart diagram illustrating another embodiment of a method for buffering storage device data in an HMB.

With reference to FIG. 14, FIG. 14 is a schematic flow chart diagram illustrating another embodiment of a method 1400 for buffering storage device data in an HMB when a storage device 504 includes a data transfer speed that is less than the data transfer speed of a host device 502. At least in the illustrated embodiment, method 1400 can begin by the storage device 504 receiving a read command from the host device 502 (block 1402).

The storage device 504 (e.g., controller 514) can determine if a TRAM 604 is full, substantially full, and/or includes greater than or equal to a predetermined amount and/or percentage of data (block 1404). In response to determining that the TRAM 604 is full, substantially full, and/or includes greater than or equal to a predetermined amount and/or percentage of data (e.g., a "YES" in block 1404), metadata for the data requested in the read command is buffered in an XTRAM 508 (block 1406). The controller 514 can subsequently determine that the TRAM 604 is no longer is full, substantially full, and/or includes greater than or equal to a predetermined amount and/or percentage of data (block 1408) and buffer the data in a memory device 512 in the TRAM 604 (block 1410). Here, when the TRAM 604 is no longer is full, substantially full, and/or includes greater than or equal to a predetermined amount and/or percentage of data, storage priority in the TRAM 604 is given to the data corresponding to the metadata buffered in the XTRAM 508.

In response to determining that the TRAM 604 is not full, substantially full, and/or includes greater than or equal to a predetermined amount and/or percentage of data (e.g., a "NO" in block 1404), the data requested in the read command is buffered in the TRAM 508 (block 1410). Subsequently, the storage device 504 (e.g., controller 514) can determine if the host device 502 is available to receive the requested data that is being buffered in the TRAM 604 (block 1412).

In response to determining that the host device is unavailable (e.g., a "NO" is block 1412), the data remains buffered in the TRAM 604 (return 1414). In response to determining that the host device is available (e.g., a "YES" is block 1412), the data buffered in the TRAM 604 is transmitted to the host device 502 (block 1416).

The metadata buffered in the XTRAM 508 may subsequently be erased (block 1418). In some embodiments, the metadata is erased from the XTRAM 508 in response to receiving a notification and/or indication that the data has been read to the host device 502 free from error.

A means for receiving data at a memory device 120, 210, 504 from a host device 110, 502 for storing in non-volatile memory 122, 200, 512 of the memory device 120, 210, 504, in various embodiments, may include a buffering component 150, an I/O circuit 606, a non-volatile memory media controller 126, 244, 514, a non-volatile memory device interface 139, a block I/O interface 131, an SCM interface 132, a cache interface 133, a die controller 220, 514, a die state machine 222, other logic hardware, and/or other executable code stored on a computer readable storage medium. Other embodiments may include similar or equivalent means for receiving data at a memory device 120, 210, 504 from a host device 110, 502 for storing in non-volatile memory 122, 200, 512 of the memory device 120, 210, 504.

A means for sending at least a portion of received data from a memory device 120, 210, 504 back to a memory buffer 112, 506, 508, 510 of the host device 110, 502 prior to storing the portion of the received data in non-volatile memory 122, 200, 512 of the memory device 120, 210, 504, in various embodiments, may include a buffering component 150, a transfer circuit 608, a non-volatile memory media controller 126, 244, 514, a non-volatile memory device interface 139, a block I/O interface 131, an SCM interface 132, a cache interface 133, a die controller 220, 514, a die state machine 222, a bus 125, 232, other logic hardware, and/or other executable code stored on a computer readable storage medium. Other embodiments may include similar or equivalent means for sending at least a portion of received data from a memory device 120, 210, 504 back to a memory buffer 112, 506, 508, 510 of the host device 110, 502 prior to storing the portion of the received data in non-volatile memory 122, 200, 512 of the memory device 120, 210, 504.

A means for erasing a portion of received data from a memory 112, 506, 508, 510 of a host device 110, 502 in response to determining that received data is written to a memory device 120, 210, 504, in various embodiments, may include a buffering component 150, an erase circuit 610, a non-volatile memory media controller 126, 244, 514, a die controller 220, 514, a die state machine 222, a processor 111, other logic hardware, and/or other executable code stored on a computer readable storage medium. Other embodiments may include similar or equivalent means for erasing a portion of received data from a memory 112, 506, 508, 510 of a host device 110, 502 in response to determining that received data is written to a memory device 120, 210, 504.

A means for writing a portion of received data from a memory buffer 112, 506, 508, 510 of a host device 110, 502 to a volatile memory buffer 602, 604 of a memory device 120, 210, 504 in response to determining an available storage capacity of the volatile memory buffer 602, 604 of the memory device 120, 210, 504 is sufficient to store the portion of the received data, in various embodiments, may include a buffering component 150, an I/O circuit 606, a buffer memory 602, a TRAM 604, a FIFO 510, a non-volatile memory media controller 126, 244, 514, a non-volatile memory device interface 139, a block I/O interface 131, an SCM interface 132, a cache interface 133, a die controller 220, 514, a die state machine 222, other logic hardware, and/or other executable code stored on a computer readable storage medium. Other embodiments may include similar or equivalent means for writing a portion of received data from a memory buffer 112, 506, 508, 510 of a host device 110, 502 to a volatile memory buffer 602, 604 of a memory device 120, 210, 504 in response to determining an available storage capacity of the volatile memory buffer 602, 604 of the memory device 120, 210, 504 is sufficient to store the portion of the received data.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus comprising:
a non-volatile memory; and
a controller in communication with the non-volatile memory, wherein the controller is configured to:
receive an input/output (I/O) request including first data, and
transmit at least a portion of the first data to a host memory buffer (HMB) of a host device separate from the non-volatile memory and the controller for storage until a trigger event occurs, the I/O request is a read request, the portion of the first data includes metadata associated with second data to be read from the non-volatile memory and the trigger event comprises determining that the controller is available to receive the second data, the metadata includes TASK ID information and data path configuration information for reading the second data by the host device.

2. The apparatus of claim 1, wherein:
the host device includes a first data transfer speed greater than a second transfer speed for the controller.

3. The apparatus of claim 1, wherein in response to the trigger event occurring, the controller is further configured to facilitate erasing the portion of the first data from the HMB.

4. The apparatus of claim 1, wherein the portion of the first data stored in the HMB comprises a size of at least two word lines worth of data.

5. The apparatus of claim 1, wherein:
the controller comprises a transfer random access memory (TRAM); and
the trigger event comprises determining that the TRAM includes an available amount of storage space sufficient to store the portion of the first data stored in the HMB.

6. The apparatus of claim 5, wherein:
in response to the trigger event, the controller is further configured to transmit the portion of the first data stored in the HMB to the TRAM.

7. The apparatus of claim 1, wherein:
the controller includes a first data transfer speed greater than a second transfer speed for the host device.

8. The apparatus of claim 7, wherein:
in response to the trigger event, the controller is further configured to transmit the portion of the first data from the HMB to the host device.

9. The apparatus of claim 1, wherein:
the metadata in the HMB is managed using a first-in-first-out (FIFO) queue.

10. The apparatus of claim 9, wherein:
the controller comprises a transfer random access memory (TRAM);
in response to the trigger event, the controller is further configured to transmit the portion of the first data from the non-volatile memory to the TRAM; and
the controller is further configured to transmit the portion of the first data from the TRAM to the host device.

11. A method, comprising:
receiving, by a controller, a read command associated with first data from a host device; and
transmitting at least a portion of the first data from the controller to a host memory buffer (HMB) of the host device for at least temporary storage until a trigger event occurs, wherein the host device and the HMB are separate from the controller, the portion of the first data includes metadata associated with second data to be read from a non-volatile memory, the trigger event comprises determining that a transfer random access memory (TRAM) of the controller is available to receive the second data, the metadata includes TASK ID information and data path configuration information for reading the second data by the host device.

12. The method of claim 11, wherein:
the method further comprises erasing the first data from the HMB in response to the trigger event.

13. The method of claim 11, wherein:
the host device includes a first data transfer speed greater than a second transfer speed for the controller.

14. The method of claim 11, wherein:
the controller includes a first data transfer speed greater than a second data transfer speed for the host device; and
the method further comprises, in response to the trigger event:
transmitting the first data from the HMB to the TRAM, and
reading the first data from the TRAM to the host device.

15. The method of claim 11, wherein:
the metadata in the HMB is managed using a first-in-first-out (FIFO) queue.

16. A system, comprising:
a host device including a host memory buffer (HMB); and
a non-volatile memory in communication with the host device, the non-volatile memory including a controller comprising:
an input/output (I/O) circuit configured to receive an I/O operation comprising first data from the host device, the I/O operation comprises a read operation, and
a transfer circuit configured to transmit at least a portion of the first data to the HMB until a trigger event occurs, the portion of the first data includes metadata associated with second data to be read from the non-volatile memory and the trigger event comprises determining that the controller is available to receive the second data, the metadata includes TASK ID information and data path configuration information for reading the second data by the host device.

17. The system of claim 16, wherein:
the controller further comprises an erase circuit configured to erase the first data from the HMB in response to the trigger event.

18. An apparatus, comprising:
a non-volatile memory; and
a controller in communication with the non-volatile memory, the controller includes means for receiving a read request for first data from a host device and means for transmitting at least a portion of the first data to a host memory buffer (HMB) of the host device separate from the non-volatile memory and the controller for storage until a trigger event occurs, the portion of the first data includes metadata associated with second data to be read from the non-volatile memory and the trigger event comprises determining that the controller is available to receive the second data, the metadata includes TASK ID information and data path configuration information for reading the second data by the host device.

19. The apparatus of claim 18, wherein:
the host device includes a first data transfer speed that is less than a second transfer speed for the controller.

20. The apparatus of claim 18, wherein:
the controller comprises a transfer random access memory (TRAM); and
the trigger event comprises determining that the TRAM includes an available amount of storage space sufficient to store the portion of the first data stored in the HMB.

\* \* \* \* \*